(12) United States Patent
Noguchi et al.

(10) Patent No.: US 7,354,301 B2
(45) Date of Patent: Apr. 8, 2008

(54) DC ADAPTER AND ELECTRONIC APPARATUS USING THE SAME

(75) Inventors: Takayuki Noguchi, Saitama (JP); Masumi Iohara, Kanagawa (JP); Yuri Okumura, Kanagawa (JP); Yoichi Miyajima, Tokyo (JP); Hideaki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/564,084

(22) PCT Filed: May 17, 2005

(86) PCT No.: PCT/JP2005/008962

§ 371 (c)(1),
(2), (4) Date: Nov. 21, 2006

(87) PCT Pub. No.: WO2005/112241

PCT Pub. Date: Nov. 24, 2005

(65) Prior Publication Data

US 2007/0164703 A1    Jul. 19, 2007

(30) Foreign Application Priority Data

May 19, 2004  (JP) ............................. 2004-148501
Dec. 27, 2004  (JP) ............................. 2004-378329

(51) Int. Cl.
*H01R 3/00*  (2006.01)

(52) U.S. Cl. ................ 439/500; 439/677; 439/680; 429/1

(58) Field of Classification Search ........ 439/500, 439/680, 677; 429/1
See application file for complete search history.

(56) References Cited

U.S. PATENT DOCUMENTS 3,407,380 A  *  10/1968  Krehbiel ..................... 439/680

(Continued)

FOREIGN PATENT DOCUMENTS

JP           56-48245           4/1981

(Continued)

*Primary Examiner*—Tho D. Ta
(74) *Attorney, Agent, or Firm*—Oblon, Spivak, McClelland, Maier & Neustadt, P.C.

(57) ABSTRACT

A DC adapter that can be housed in a battery housing portion of an electronic apparatus selectively with a primary and secondary battery. The DC adapter is connected to an AC/DC converter and is inserted into a battery housing portion of an electronic apparatus so as to supply the electronic apparatus with a DC power, wherein a substantially cylindrical adapter main body has an insertion limiting portion which is guided by an insertion guide portion of the battery housing portion when the DC adapter is inserted into the battery housing portion with the proper polarity, and comes into contact with the contact portion of the battery housing portion when the DC adapter is inserted into the battery housing portion with the reversed polarity so as to limit the insertion of the DC adapter. The insertion limiting portion is formed by projecting a part of the outer circumference of the cylindrical adapter main body in a rectangular manner along the longitudinal direction of the main body and has two sides each of which extends from a part of the outer circumference of the DC adapter. The center angle of the circular arc obtained by connecting the proximal ends of the two sides on the outer circumference of the DC adapter is less than 90°.

10 Claims, 17 Drawing Sheets

U.S. PATENT DOCUMENTS

| | | | |
|---|---|---|---|
| 4,468,439 A | 8/1984 | Ohara et al. | |
| 5,626,979 A * | 5/1997 | Mitsui et al. | 429/97 |
| 6,265,091 B1 * | 7/2001 | Pierson et al. | 429/1 |

FOREIGN PATENT DOCUMENTS

| | | |
|---|---|---|
| JP | 58-49590 | 4/1983 |
| JP | 58-82461 | 5/1983 |
| JP | 62-2382 | 1/1987 |
| JP | 2-139882 | 5/1990 |
| JP | 4-18990 | 2/1992 |
| JP | 5-205712 | 8/1993 |
| JP | 5-67191 | 9/1993 |
| JP | 6-267518 | 9/1994 |
| JP | 11-176404 | 7/1999 |
| JP | 11-262190 | 9/1999 |
| JP | 2001-215585 | 8/2001 |
| JP | 2002-208388 | 7/2002 |

* cited by examiner

DC ADAPTER AND ELECTRONIC APPARATUS USING THE SAME

TECHNICAL FIELD

The present invention relates to a DC adapter for supplying an electronic apparatus that uses a dry battery as a power source with an external DC power and an electronic apparatus using the DC adapter.

This application is based upon and claims the benefit of priority from the prior Japanese Patent Applications Nos. 2004-148501, filed May 19, 2004 and 2004-378329, filed Dec. 27, 2004, the entire contents of which are incorporated herein by reference.

BACKGROUND ART

Conventionally, an electronic apparatus that uses primary and secondary batteries as a power source has widely been used. The electronic apparatus of this type has a battery housing portion into which the primary battery or secondary battery is inserted. From the battery housed in the battery housing portion, a power is supplied to the apparatus and thereby the electronic apparatus is driven. By putting the secondary battery for use in the electronic apparatus in a dedicated battery charger, it can be re-charged and used repeatedly.

As the primary battery for use in an electronic apparatus that is driven by a battery, a size AA battery is available. Some electronic apparatuses that use the size AA battery have a battery housing portion into which two size AA batteries are inserted in consideration of power consumption of the apparatus or battery life.

In order to house the secondary battery in the battery housing portion in a compatible manner with the size AA battery in an electronic apparatus capable of using both primary and secondary batteries, a secondary battery having the same shape as that of the size AA battery is adopted. By making the shape of the secondary battery identical to the shape of the size AA battery as described above, it is possible to put the secondary battery in the battery housing portion for the size AA battery in a compatible manner with the size AA battery.

In this case, in the secondary battery which can be housed in the battery housing portion for the size AA battery in a compatible manner, when the battery housing portion into which two size AA batteries are inserted is used, the secondary batteries each having the same shape as that of the size AAA battery are arranged, as an assembled battery.

Some electronic apparatus capable of using both primary and secondary batteries are configured to use a DC adapter. The DC adapter converts a commercial alternating power into a DC power using an AC/DC converter and supplies the apparatus with the DC power. Some DC adapters of this type are configured to be housed in the battery housing portion for primary and secondary batteries. In order to realize this configuration, proposed is a DC adapter having substantially the same size as that of the assembled secondary battery whose size is the same as that obtained by arranging the two size AA batteries and having substantially a similar shape to the assembled secondary battery. Electrodes are formed on the DC adapter. The DC adapter is provided with electrodes. When being housed in the battery housing portion for the primary and secondary batteries, the electrodes come into contact with terminals formed in the battery housing portion with which the electrodes provided in the primary and secondary batteries come into contact. Therefore, when the DC adapter is housed in the battery housing portion, the electrodes come into contact with terminals formed in the battery housing portion, and a DC power is supplied to an electronic apparatus through the terminals and electrodes.

The use of thus configured DC adapter eliminates the need to form a DC jack connector for an AC/DC adapter or DC adapter on the electronic apparatus side, that is, it is only necessary to form a battery housing portion on the electronic apparatus side, contributing to reduction in the number of parts of the electronic apparatus to be used and, eventually, the size of the electronic apparatus itself.

In such a DC adapter that can be housed in the battery housing portion for the primary and secondary batteries in a compatible manner, electrode terminals formed on the DC adapter have defined polarity like the primary and secondary batteries. Thus, if the DC adapter is inserted into the battery housing portion with the polarity thereof wrongly set, the electronic apparatus does not operate, or any trouble related to the operation of the apparatus may be caused. In order to prevent the wrong insertion, a configuration can be considered in which the DC adapter is formed in a left-right asymmetrical shape and the shape of the battery housing portion is correspondingly formed. As a result, however, when the primary or secondary battery, or assembled battery obtained by arranging the secondary batteries are inserted into the battery housing portion having the above configuration, the inserted battery may rattle within the housing portion. In addition, assume that the terminals of the battery housing portion with which the electrodes of the DC adapter come into contact are shared between the primary or secondary battery and DC adapter. In this case, when the DC adapter is used in the apparatuses other than its conforming apparatus, there is a possibility that the operating voltage may differ from that of the primary or secondary battery, so that it is impossible to ensure safety of the electronic apparatus, in some cases.

DISCLOSURE OF THE INVENTION

An object of the present invention is to provide a DC adapter and an electronic apparatus using the DC adapter, in which wrong insertion of the DC adapter that is configured to be housed in the battery housing portion for primary and secondary batteries can be prevented, and positional regulation in the battery housing portion is accurately established for the primary and secondary batteries so that the batteries can be housed in the battery housing portion in a stable condition.

Another object of the present invention is to provide a DC adapter and an electronic apparatus using the DC adapter, in which even when a DC adapter is inserted into the apparatuses other than its conforming apparatus, safety of the apparatuses can be ensured.

To solve the above problems, according to the present invention, there is provided a DC adapter which is connected to an AC/DC converter and is inserted into a battery housing portion of an electronic apparatus so as to supply the electronic apparatus with a DC power, wherein a substantially cylindrical adapter main body has an insertion limiting portion which is guided by an insertion guide portion of the battery housing portion when the DC adapter is inserted into the battery housing portion with the proper polarity, and comes into contact with the insertion end side wall of the battery housing portion when the DC adapter is inserted into the battery housing portion with the reversed polarity so as to limit the insertion of the DC adapter. The insertion limiting portion is formed by projecting a part of the outer circumference of the cylindrical main body in a rectangular manner along the longitudinal direction of the main body. It has two sides each of which extends from a part of the outer circumference of the DC adapter, and the center angle of the circular arc obtained by connecting the proximal ends of the two sides on the outer circumference of the DC adapter is less than 90°.

According to the present invention, there is provided an electronic apparatus comprising a battery housing portion into which a DC adapter which is connected to a cylindrical primary battery, a cylindrical secondary battery, or AC/DC converter to supply the electronic apparatus with a DC power is inserted. The battery housing portion includes an insertion guide portion which is formed by cutting, in a rectangular shape, a part of the circular inner circumferential wall thereof to meet the shape of an insertion limiting portion formed by projecting a part of the outer circumference of the DC adapter. The battery housing is engaged with the insertion limiting portion when the DC adapter is inserted with the proper polarity to guide the insertion of the DC adapter. The center angle of the circular arc obtained by connecting the proximal ends of two sides constituting the insertion guide portion on the inner circumference of the battery housing portion is less than 90°. When the DC adapter is inserted with the reversed polarity, the insertion limiting portion comes into contact with the insertion end side wall of the battery housing portion and the insertion of the DC adapter is limited.

According to the DC adapter and electronic apparatus using the DC adapter, when the DC adapter is housed in the battery housing portion, the insertion of the DC adapter is guided by the insertion guide portion having a shape corresponding to that of the insertion limiting portion of the DC adapter. As a result, the DC adapter can be inserted into the battery housing portion smoothly. When the DC adapter is inserted into the battery housing portion with the reversed polarity, the insertion limiting portion comes into contact with the side wall formed in the battery housing portion with the result that the insertion of the DC adapter is limited. As a result, wrong insertion can be prevented. Further, even when a size AA dry battery or secondary battery is inserted into the battery housing portion, the inner circumferential wall can also support a part of the side wall of the above battery on the insertion guide portion side, and they have their positions regulated in the cutting direction of the insertion guide portion to realize stable insertion.

BEST MODE FOR CARRYING OUT THE INVENTION

A digital still camera to which a DC adapter and an electronic apparatus according to the present invention are applied will be described below in detail with reference to the accompanying drawings.

Figure 1:
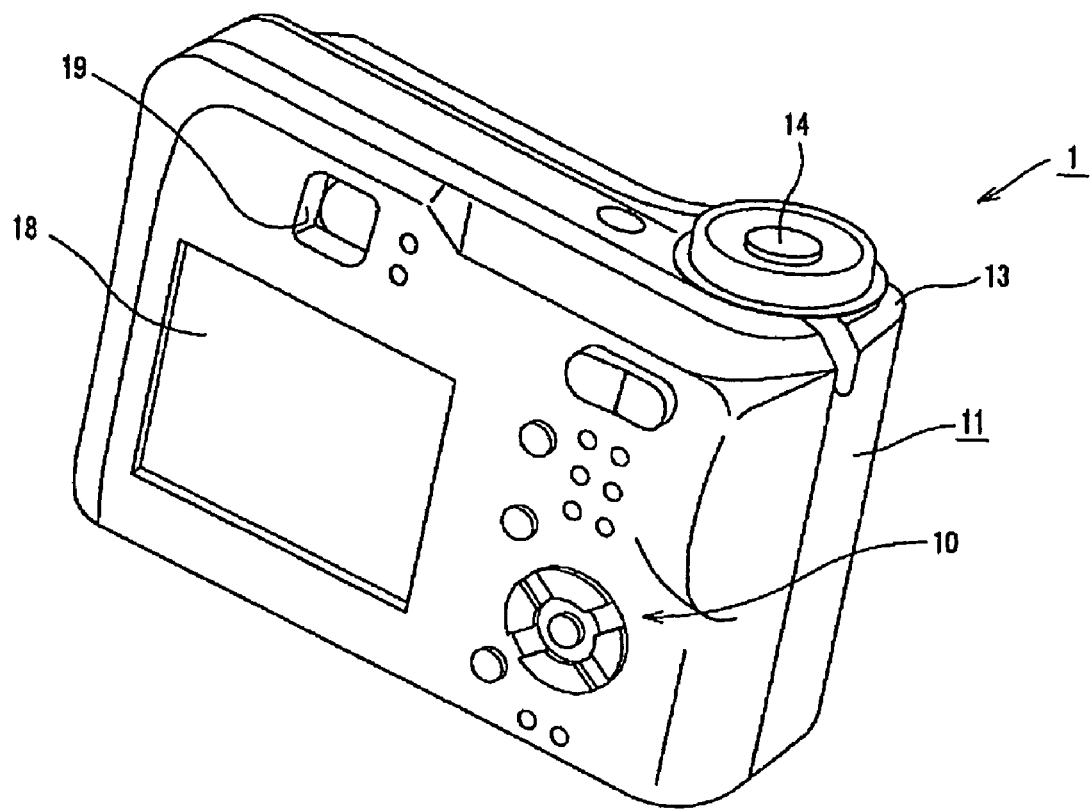
FIG. 1 is a perspective view showing a digital still camera to which the present invention is applied.
Figure 2:
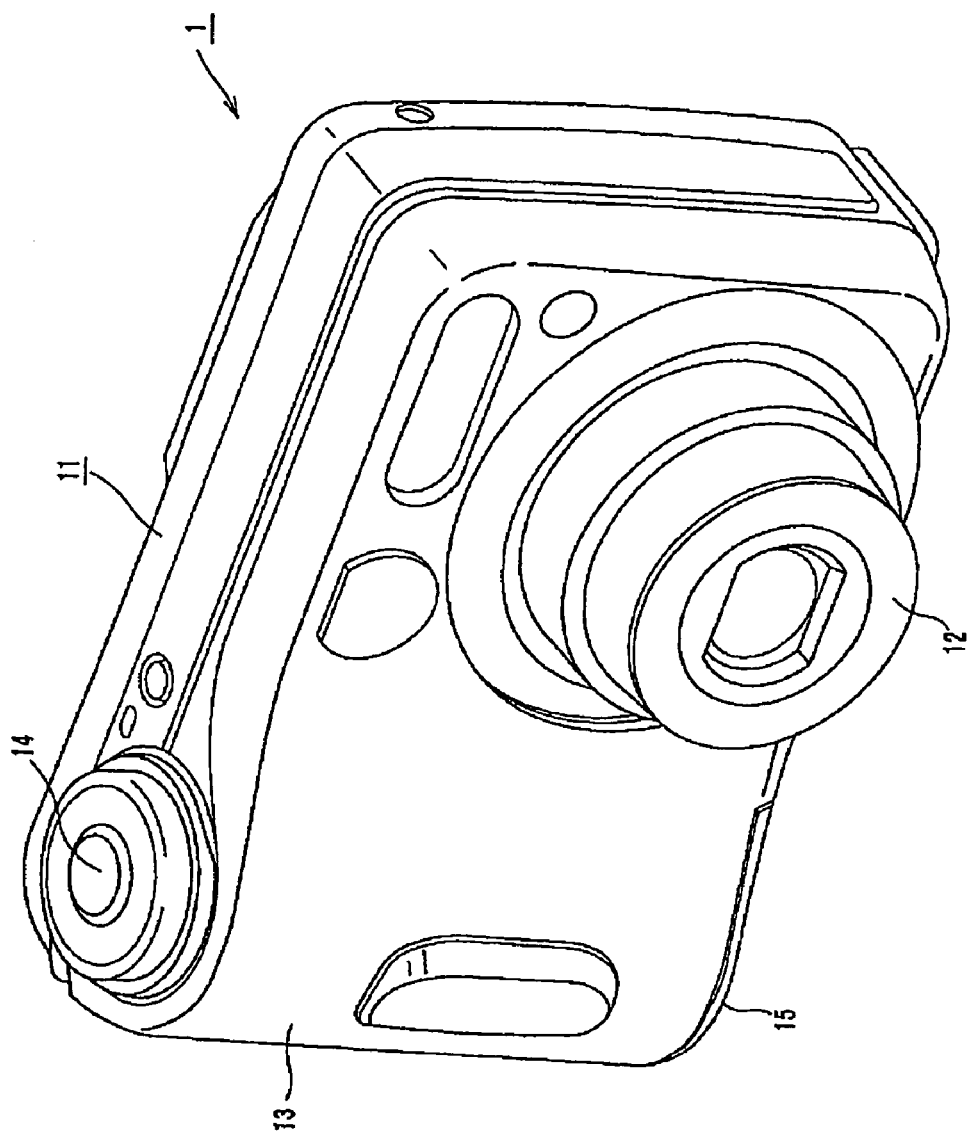
FIG. 2 is a perspective view showing the digital still camera.
Figure 3:
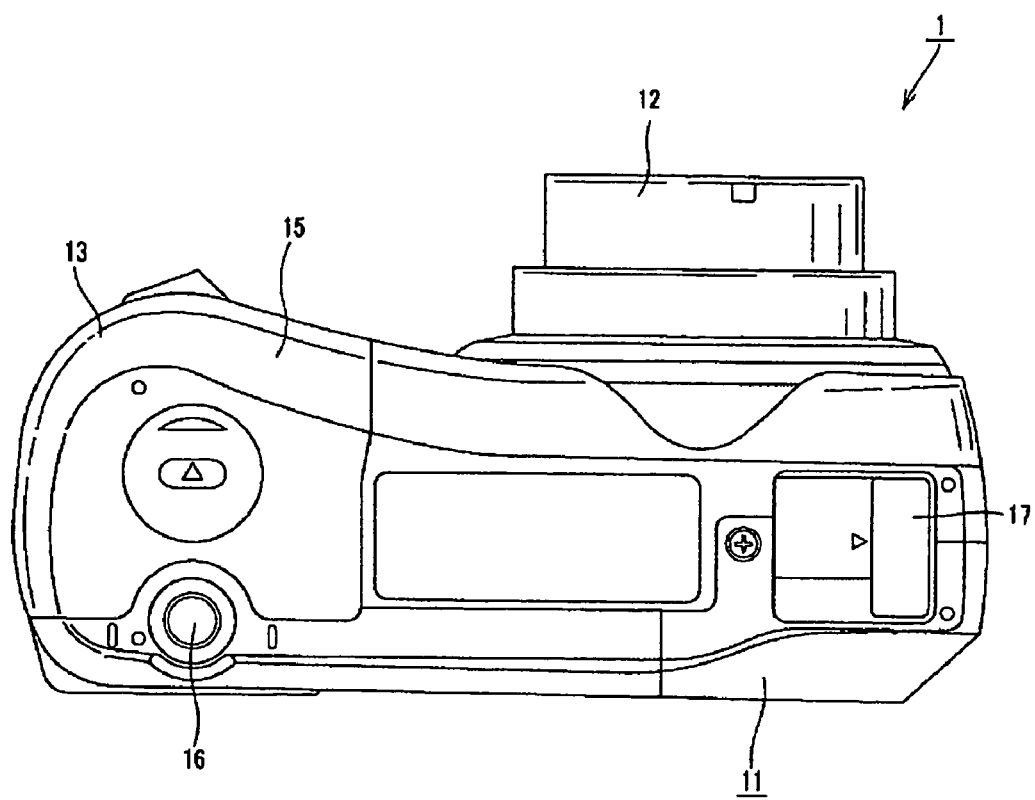
FIG. 3 is a bottom view showing the digital still camera.

A digital still camera 1 to which the present invention is applied has a camera main body 11 as shown in FIGS. 1 to 3. The camera main body 11 has a lens portion 12 constituted by a lens barrel housing a plurality of lenses on one side of the front surface thereof and has a grip portion 13 which is gripped by a user on the other side of the front surface thereof. The grip portion 13 is so formed as to blow up from the front surface of the camera main body 11 so that the grip portion 13 can be stably gripped by a hand and fingers, as shown in FIGS. 2 and 3. The camera main body 11 also has a shutter button 14 on the grip portion 13 side of the upper surface.

Formed within the grip portion 13 is a battery housing portion 20 (shown in FIG. 9) which houses a primary battery such as a dry battery 4 (shown in FIG. 6) or a rechargeable battery such as a nickel-hydrogen secondary battery 5 (also shown in FIG. 6) as a simple body, or houses a battery unit 2 (shown in FIG. 5) in which a plurality of batteries are arranged in an integrated manner. On the bottom surface on the side at which the grip portion 13 is formed, a battery cover 15 for the battery housing portion 20 is so formed as to be freely opened and closed, as shown in FIG. 3. The battery housing portion 20 can selectively house a primary and secondary battery and battery unit 2, as well as a DC adapter 3 (shown in FIG. 6) which converts an alternating current power source to a direct current power source to thereby supply a power circuit of the camera main body 11 with the direct current power source. Therefore, the camera main body 11 does not have a connector, a switching circuit, and a switch for a DC jack to which an external direct current power source is supplied, thereby reducing the size of the camera itself. The details of the battery housing portion 20 and battery unit 2 and DC adapter 3 to be inserted into the battery housing portion 20 will be described later.

An attachment hole 16 to which a tripod or the like is attached is formed in the portion adjacent to the battery cover 15 on the bottom surface of the camera main body 11. The attachment hole 16 serves as an attachment hole to which an accessory like the tripod is attached as well as an engagement hole with which a positioning projection formed in the attachment portion of a stand is engaged when the digital still camera 1 is mounted on the stand. Further, formed on the bottom surface of the camera main body 11 on the side at which the lens portion 12 is formed is a jack portion 17 for establishing electrical connection with the stand.

As shown in FIG. 1, a display section 18 is formed on the rear surface of the camera main body 11 at the area behind the lens portion 12. The display section 18 has, for example, substantially a rectangular shape and is constituted by a display device such as an LCD (Liquid Crystal Display) or organic EL (Electroluminescence) display. A finder section 19 is formed on the camera main body 11 above the display section 18. An operation section 10 including a plurality of operation buttons is formed adjacent to the display section 18 on the rear surface of the camera main body 11. With the operation section 10, a user can not only perform an operation for allowing the display section 18 to display image data stored, for example, in an internal memory but also make detailed settings of the digital still camera 1, such as ON/OFF of a flash.

Figure 4:
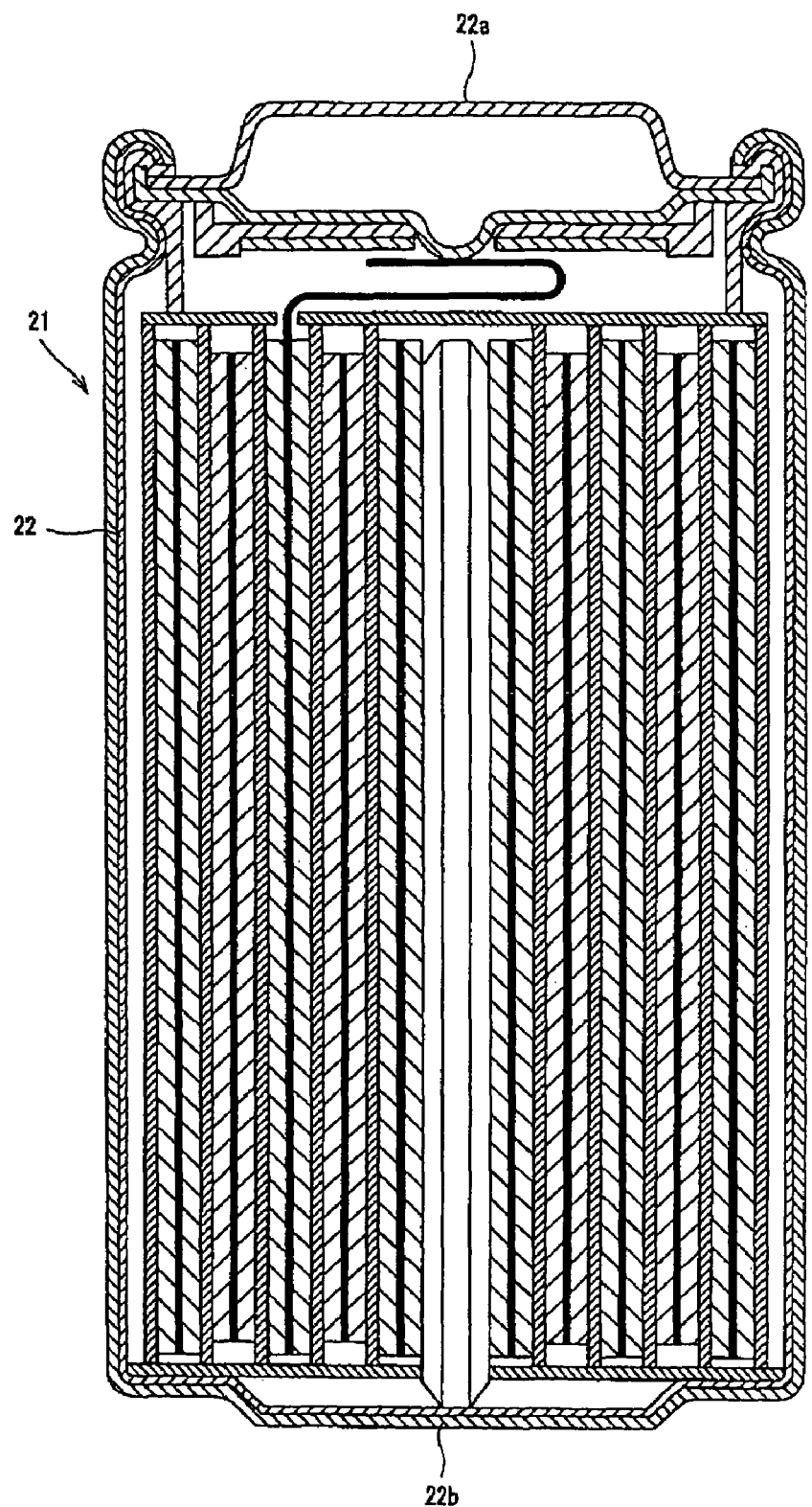
FIG. 4 is a cross-sectional view showing the interior of a nickel-hydrogen secondary battery used for a battery unit.
Figure 5E:
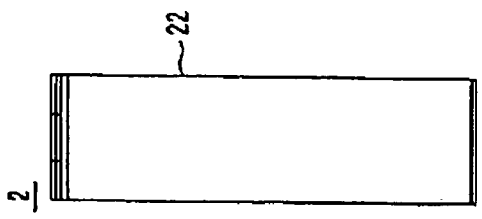
FIGS. 5A to 5G are views for explaining the battery unit, which respectively show a front view (FIG. 5A), a plan view (FIG. 5B), a bottom view (FIG. 5C), a rear view (FIG. 5D), a right-side view (FIG. 5E), a left-side view (FIG. 5F), and a perspective view (FIG. 5G)
Figure 5F:
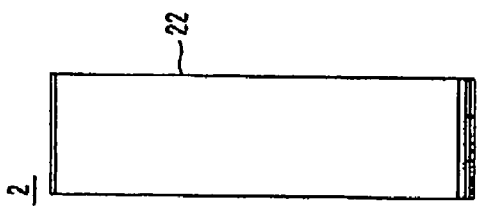
Figure 5G:
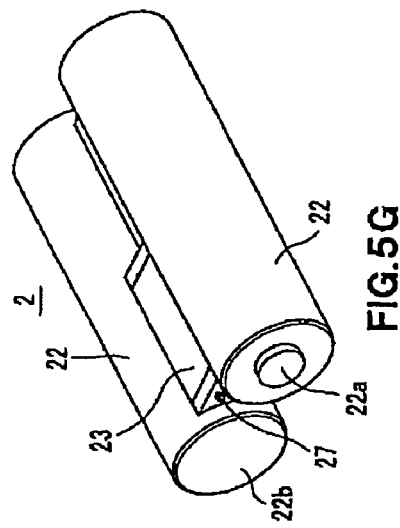
Figure 5C:
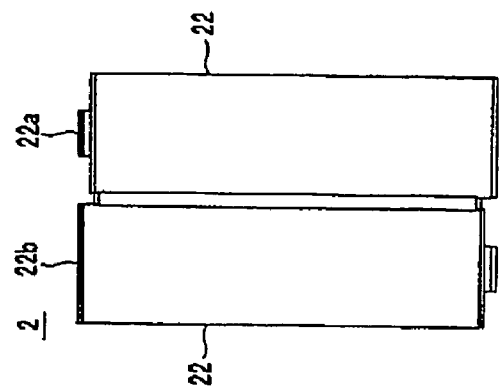
Figure 5A:
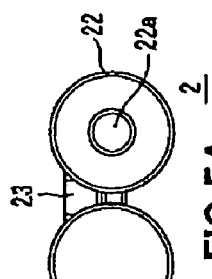
Figure 5B:
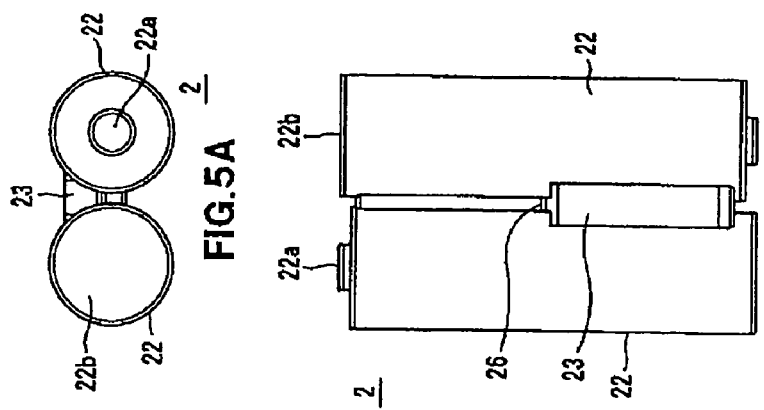
Figure 5D:
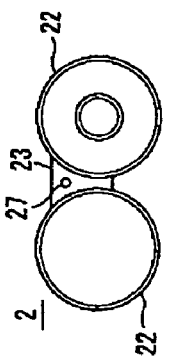

Here, a description will be given of the battery unit 2 to be housed in the battery housing portion 20. The digital still camera 1 can house, in the battery housing portion 20, for example, a size AA dry battery or a secondary battery having the same shape as that of the size AA dry battery as well as the battery unit 2 in which two secondary batteries each having the same shape of that of the size AA dry battery are arranged in an integrated manner. As the secondary battery constituting the battery unit 2, a nickel-hydrogen secondary battery 21 or the like is used. As shown in FIG. 4, the nickel-hydrogen secondary battery 21 contains, in a cylindrical battery body 22, an electrode body functioning as positive and negative poles and battery electrolyte. A positive terminal is formed at one end portion of the battery body 22 in the longitudinal direction thereof, and a negative terminal is formed at the other end portion. The electrode body contained in the battery body 22 is constituted by strip-shaped negative and positive materials carrying negative and positive active materials that can store/discharge hydrogen reversibly to each other, the negative and positive materials being wound through a separator. Negative and positive leads are drawn from the negative and positive materials respectively to form the negative and positive poles. The negative lead is welded to the bottom surface of the battery body 22 and the positive lead is welded to the battery cover of the battery body 22 to form the upper end of the battery body 22 as a positive terminal 22a and the lower end as a negative terminal 22b. The battery body 22 is covered with an insulating sheet material or the like, except for the areas of the positive terminal 22a and negative terminal 22b.

As shown in FIGS. 5A to 5G, FIG. 6, and FIG. 7, the battery unit 2 includes two nickel-hydrogen secondary batteries 21. The two nickel-hydrogen secondary batteries 21 are arranged in the direction perpendicular to the longitudinal direction of the battery body 22 with the positive terminal 22a and negative terminals 22b reversed between the two and bonded to each other through a separator 23. The separator 23, through which the two nickel-hydrogen secondary batteries 21 are bonded, includes, as shown in FIG. 8, a separate plate 24 which is bonded to the batteries along the longitudinal direction of the battery body 22, and an engaging portion 25 which has a shape corresponding to that of a concave portion 2a formed on one side of the adjacent battery bodies 22 and is engaged with a lever switch 61 (to be described later) formed in the battery housing portion 20. The two battery bodies 22 are bonded to both side surfaces of the separate plate 24 by an adhesive or the like. It should be noted that the two battery bodies are bonded to the separate plate 24 such that the positions of the tip portion of the protruding positive terminal 22a of one battery body and the end surface of the flat negative terminal 22b of the other battery body are on the same level in the longitudinal direction of the battery unit 2.

The separate plate 24 is made of a plate-like member whose side surface is formed in a circular arc shape corresponding to the shape of the battery body 22. The engaging portion 25 is formed in the middle portion to one end portion on the upper surface of the separate plate 24 in the longitudinal direction thereof. The lower surface of the separate plate 24 is flattened, so that a concave portion 2b on the other side of the battery unit 2 is formed into a groove shape extending in the longitudinal direction of the battery unit 2. A guide projection 53 formed in the battery housing portion 20 is engaged with the concave portion 2b.

The engaging portion 25 formed on the one concave portion 2a of the battery unit 2 is engaged with the lever switch 61 formed in the battery housing portion 20. This engagement enables the digital still camera 1 to identify the type of the battery unit 2. The engaging portion 25 is formed from the middle portion on the separate plate 24 in the longitudinal direction to the rear end portion in the insertion direction of the battery unit 2. The engaging portion 25 has a identification section 26 to identify the type of the battery unit 2 on the front side end surface 25a in the insertion direction of the battery unit 2 and a projection 27 which faces a supporting projection 28 (to be described later) formed on the battery cover 15 on the rear end surface 25b in the insertion direction of the battery unit 2.

The identification portion 26 is formed into, for example, a projected, flat, or concave shape depending on the charge-discharge characteristics such as service capacity, charging voltage, or charging current of the battery unit 2, as shown in FIGS. 8A to 8C. When the battery unit 2 is inserted into the battery housing portion 20, the identification section 26 is engaged with the lever switch 61 provided on the movement path of the engaging portion 25. Since the pressing force against the lever switch 61 differs depending on the above shapes of the identification section 26, the digital still camera 1 can identify the type of the inserted battery unit 2 by detecting the difference in the pressing force. Therefore, the digital still camera 1 can disallow a users operation on the camera main body 11 when, for example, a nonconforming battery unit is inserted; and it can charge the battery unit 2 at an optimal battery charging speed when the inserted battery unit 2 is a quick-chargeable one.

Figure 7:
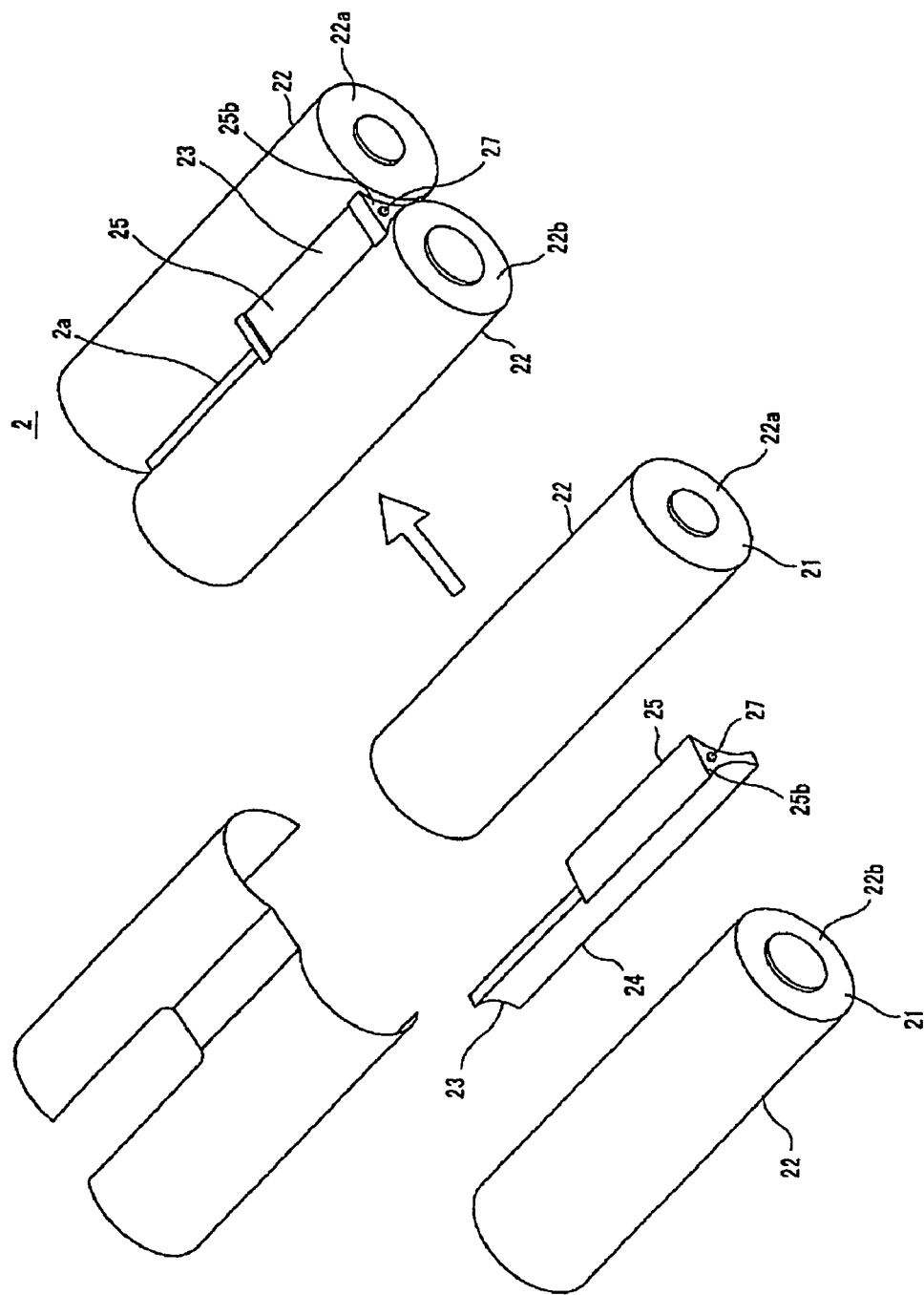
FIG. 7 is an exploded perspective view of the battery unit.
Figure 8:
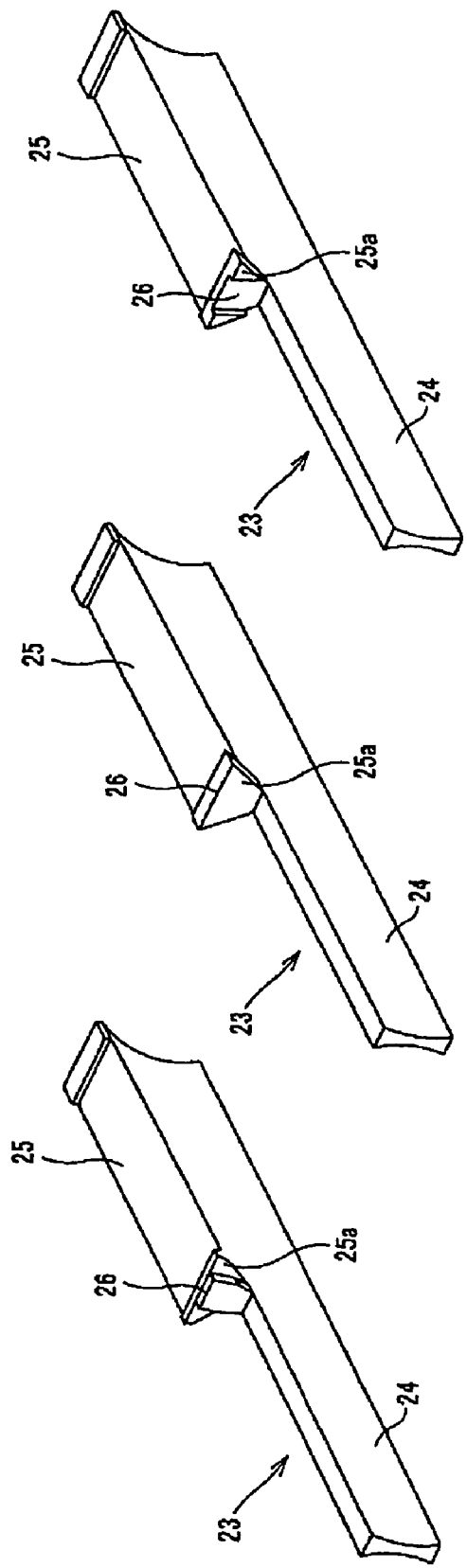
FIGS. 8A to 8C are perspective views of a separator.
Figure 9:
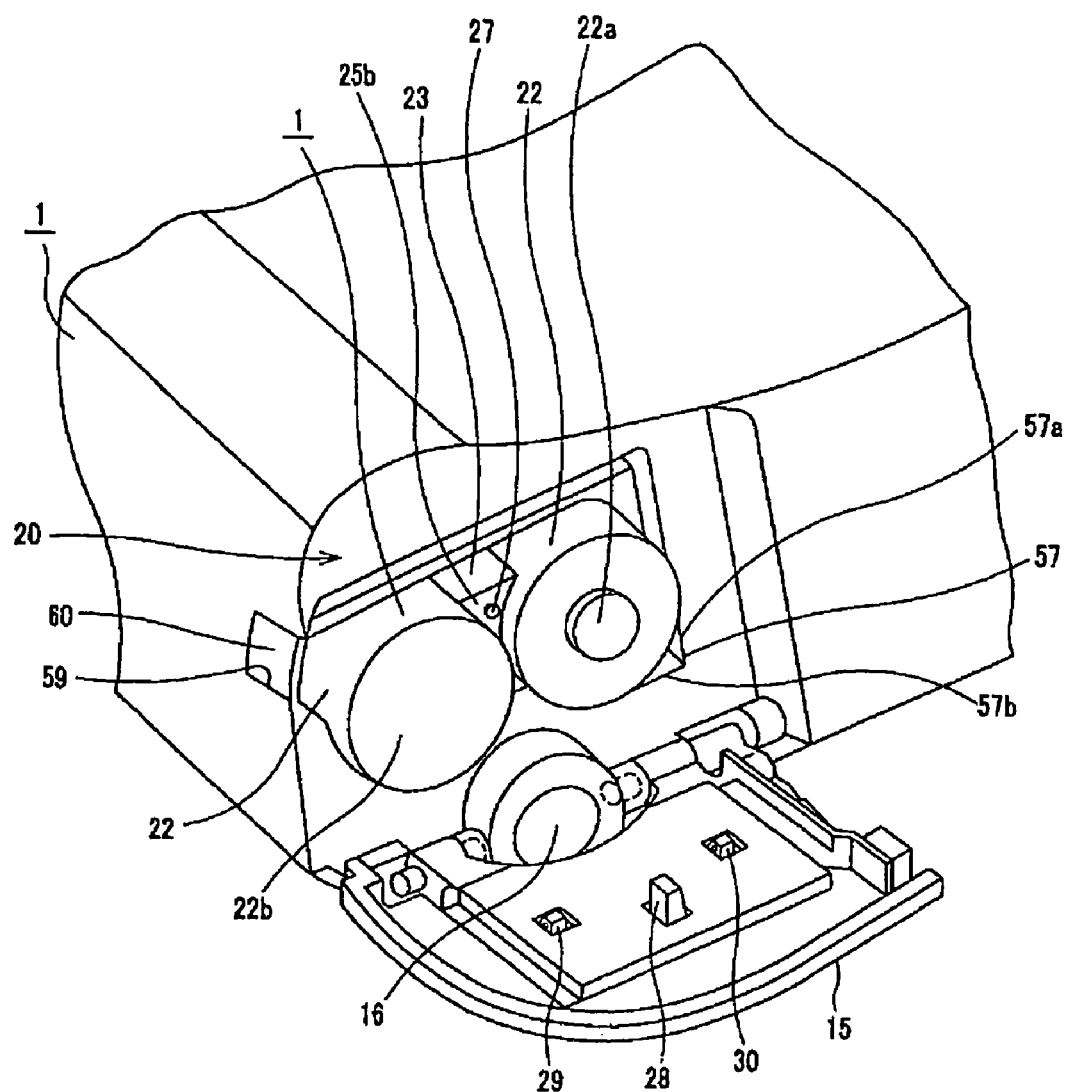
FIG. 9 is a perspective view showing a battery cover to close the battery housing portion.

The tip end of the projection 27 formed on the rear end surface 25b of the engaging portion 25 does not exceed the end surface of the battery body 22, in the longitudinal direction of the battery unit 2 as shown in FIG. 7. As shown in FIG. 9, when the battery cover 15 for the battery housing portion 20 is closed, the supporting projection 28 formed on the battery cover 15 side faces the concave portion 2a formed between the battery bodies 22, with the result that the projection 27 faces the supporting projection 28 with a predetermined clearance between them. In this state, when the digital still camera 1 falls to the ground or the like, the projection 27 and supporting projection 28 of the battery cover 15 contact each other before the nickel-hydrogen secondary battery 21 comes into contact with the battery cover 15. The contact between the projection 27 and supporting projection 28 is a point contact. Therefore, even when the camera main body 11 is subjected to an impact in the event that the digital still camera 1 falls to the ground or the like, it is possible to reduce the impact applied to the battery unit 2 as compared to a surface contact, preventing deviation or separation between the separator 23 and battery bodies 22.

In the case where the two simple dry batteries or two simple secondary batteries are housed in the battery housing portion 20, when the supporting projection 28 formed on the battery cover 15 is inserted between the dry batteries or secondary batteries that have been thus adjacently arranged, a clearance is provided to avoid the danger of a short-circuit and the like. The battery cover 15 also has a pair of cover electrodes 29 and 30, one on each side of the supporting projection 28. The cover electrodes 29 and 30 come into contact with the dry batteries or secondary batteries, or the positive terminal 22a and negative terminal 22b formed on the rear side end surface of the battery unit 2 in the insertion direction thereof.

When the battery unit 2 is inserted into the battery housing portion 20 with reversed polarity, the engaging portion 25 comes into contact with the guide projection 53 formed in the battery housing portion 20. Thus, the wrong insertion of the battery unit 2 into the battery housing portion 20 can be prevented. The engaging portion 25 is so formed in the concave portion 2a of the battery unit 2 as not to exceed the outermost diameter of the battery body 22.

When being inserted into the battery housing portion 20, the battery unit 2 having the above configuration supplies a power circuit of the camera main body 11 with a direct current power source. When the digital still camera 1 is placed on a camera stand connected to a home alternating current power source (the details of which are omitted) in a state where the battery unit 2 is housed in the battery housing portion 20, the alternating current power source is converted into a direct current power source and the battery unit 2 is charged. Further, it is possible to charge the battery unit 2 by attaching it to a charger 70.

The battery unit 2 can use the nickel-hydrogen secondary battery 21, as well as any storage batteries such as a lithium ion secondary battery, a nickel-cadmium storage battery, a lead storage battery and the like.

Figure 6:
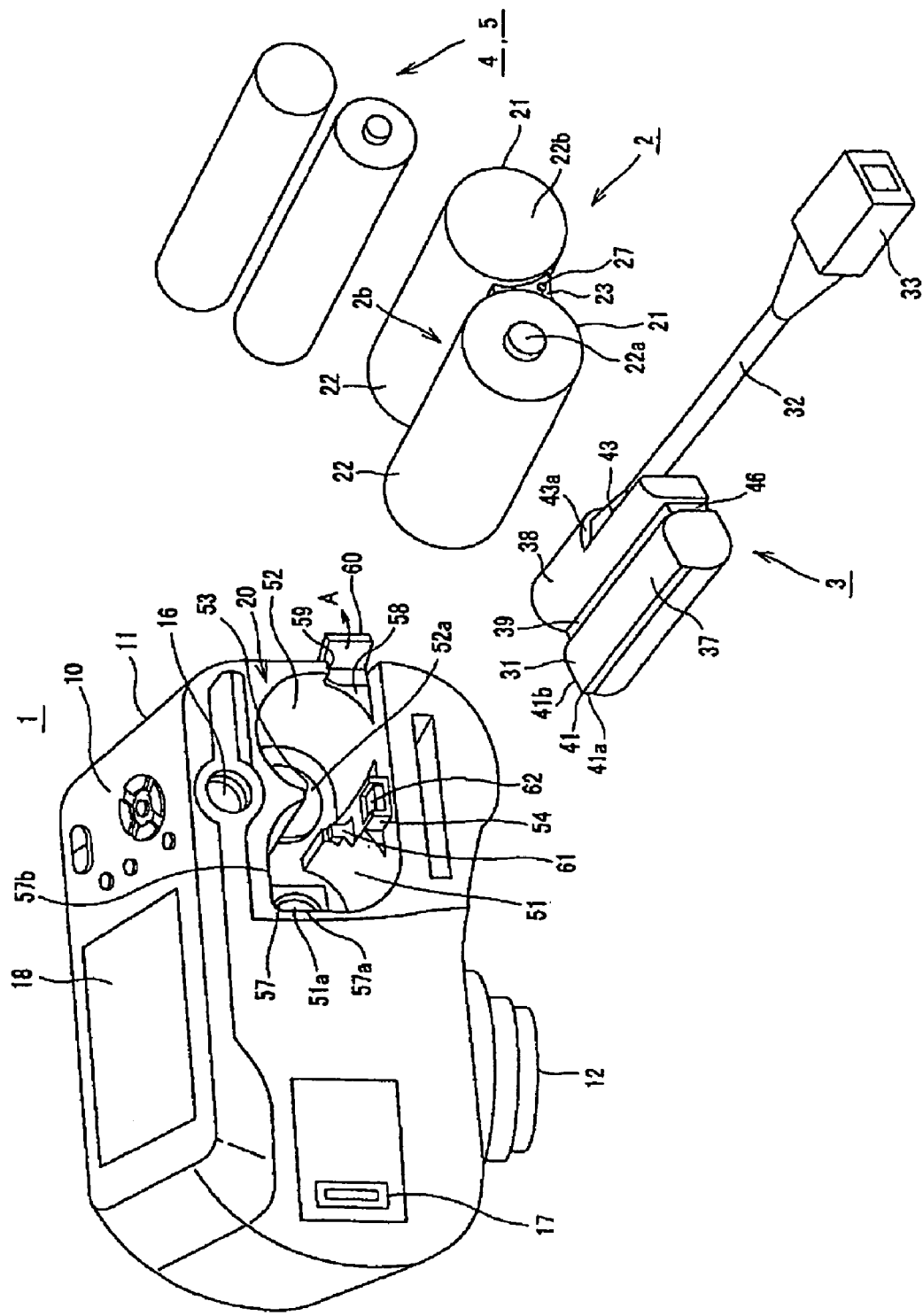
FIG. 6 is a perspective view showing a battery housing portion and various power sources to be housed in the battery housing portion.
Figure 10:
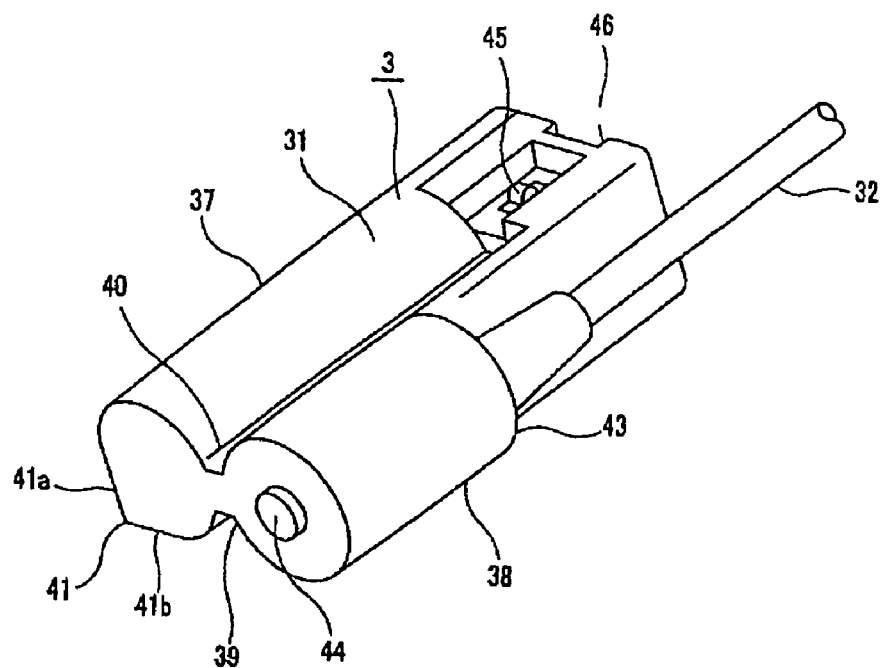
FIG. 10 is a perspective view showing a DC adapter.
Figure 11:
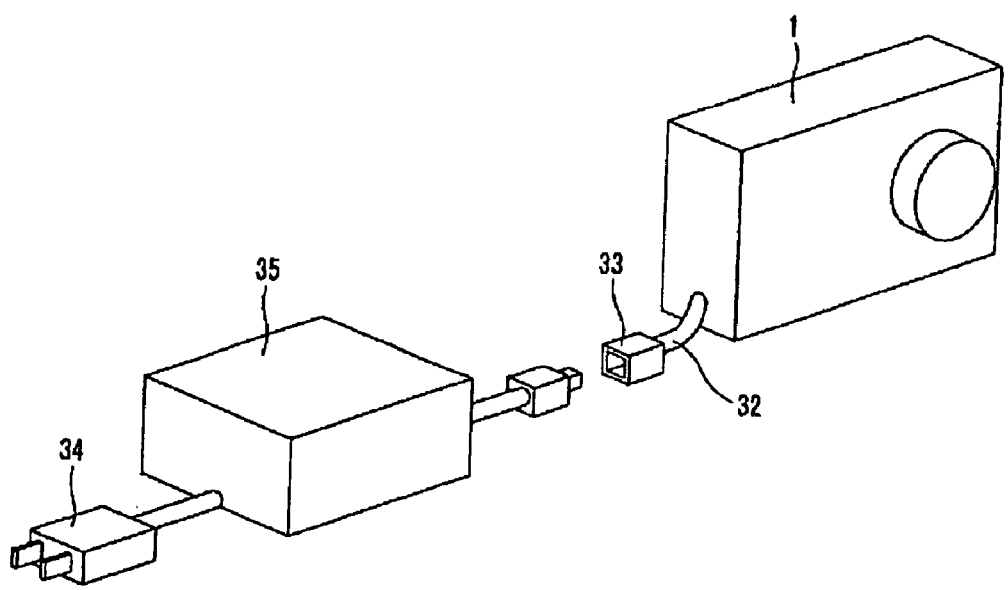
FIG. 11 is a perspective view showing a state where the digital still camera is connected to a home power supply through the DC adapter.

A description will next be given of the DC adapter 3 which is housed in the battery housing portion 20 and is connected to the home alternating current power source through an AC/DC converter to supply the digital still camera 1 with an external DC power source. The DC adapter 3 has, as shown in FIGS. 6, 10, and 11, an adapter main body 31, a cable 32 extending from the adapter main body 31, and a connector 33 provided at the distal end of the cable 32. The connector 33 is connected to an AC/DC converter 35 provided with an AC power plug 34.

Figure 12A:
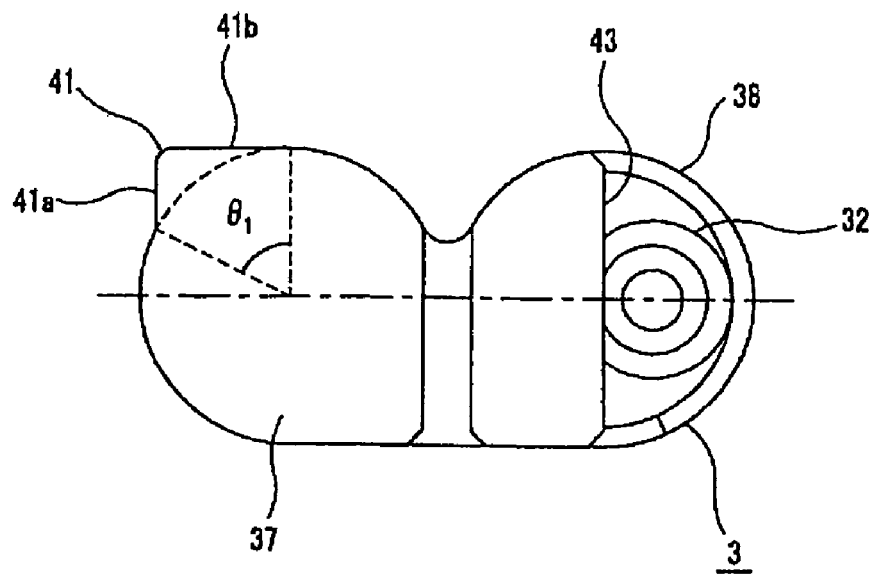
FIGS. 12A and 12B are front views showing the DC adapter.
Figure 12B:
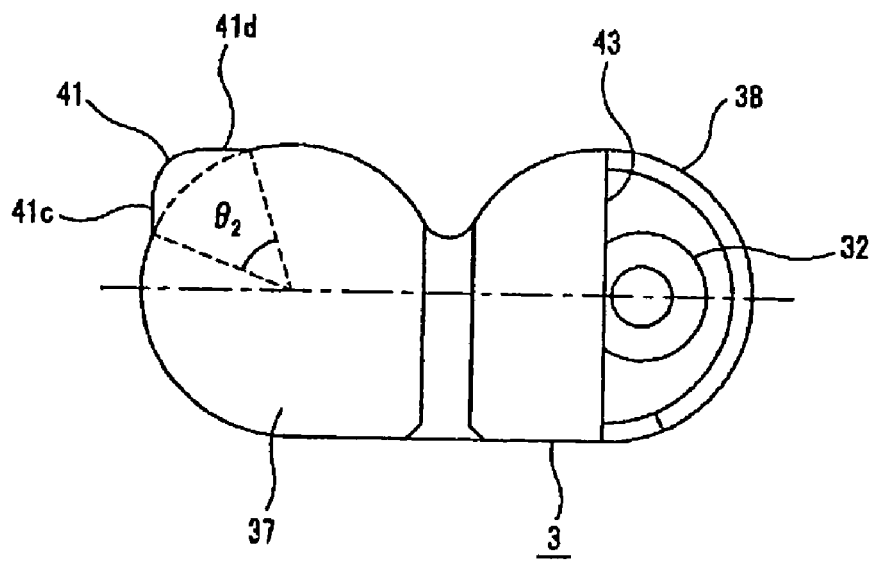

The adapter main body 31 includes first and second cylindrical potions 37 and 38 which have a shape corresponding to that of the respective housing portions of the battery housing portion 20 and are adjacently arranged in the direction perpendicular to the longitudinal direction of the adapter main body 31. First and second groove portions 39 and 40 are formed on the two sides of the adapter main body 31 between the first and second cylindrical portions 37 and 38 along the longitudinal direction. The first cylindrical portion 37 has an insertion limiting portion 41 having a shape corresponding to an insertion guide portion 57 formed in a first housing portion 51 of the battery housing portion 20. The insertion limiting portion 41, which serves to prevent the DC adapter 3 from being inserted into the battery housing portion 20 with reversed polarity, is formed by projecting a part of the outer circumference of the first cylindrical portion 37 in a rectangular manner. The insertion limiting portion 41 includes adjacent first and second limiting sides 41a and 41b between which the vertex of the insertion limiting portion 41 is located. The first and second limiting sides 41a and 41b constituting the insertion limiting portion 41, which extend from the outer circumference of the first cylindrical portion 37, cross each other at right angles, as shown in FIG. 12A. The center angle θ1 of the circular arc obtained by connecting the proximal ends of the first and second limiting sides 41a and 41b on the outer circumference of the first cylindrical portion 37 is less than 90°. That is, the first limiting side 41a extends in a slightly inclined manner to the outside of the first cylindrical portion 37 with respect to the tangential direction at the proximal end on the outer circumference of the first cylindrical portion 37; on the other hand, the second limiting side 41b extends in the tangential direction at the proximal end on the outer circumference of the first cylindrical portion 37. As a result, the first and second limiting sides 41a and 41b cross each other at right angles. Assuming that the proximal ends of the first and second limiting sides 41a and 41b on the outer circumference of the first cylindrical portion 37 are connected to each other to form a circular arc, the center angle θ1 of the circular arc is less than 90°. When being housed in the first housing portion 51 of the battery housing portion 20, the DC adapter 3 is guided by the insertion guide portion 57 formed in the first housing portion 51 and having a shape corresponding to that of the insertion limiting portion 41, so that the DC adapter 3 can be inserted into the battery housing portion 20 smoothly. When the DC adapter 3 is inserted into the battery housing portion 20 with the first and second cylindrical portion 37 and 38 reversed (that is, with reversed polarity) the insertion limiting portion 41 comes into contact with a contact portion 58 formed in the battery housing portion 20, thereby preventing the insertion. Alternatively, as shown in FIG. 12B, third and fourth limiting sides 41c and 41d are extended from different proximal ends on the outer circumference of the first cylindrical portion 37 in a slightly inclined manner to the outside of the first cylindrical portion 37 with respect to the tangential direction at the respective proximal ends, such that the third and fourth limiting sides 41c and 41d cross each other at right angles and the center angle θ2 of the circular arc obtained by connecting the proximal ends of the third and fourth limiting sides 41c and 41d on the outer circumference of the first cylindrical portion 37 is less than 90°.

Incidentally, in the insertion limiting portion 41, the intersecting point between the first and second insertion limiting sides 41a and 41b is chamfered in a circular arc. Therefore, if the insertion limiting portion 41 is pressed against the insertion guide portion 57 formed in the battery housing portion 20 at the time when the adapter 3 is inserted into the battery housing portion 20, they do not interfere with each other. As a result, it is possible to smoothly slide the adapter 3 as well as prevent dust and the like due to the slide from being generated.

Incidentally, the front and rear end surfaces of the first cylindrical portion 37 in the insertion direction thereof have no electrode terminals and are flattened.

The second cylindrical portion 38 has a cut portion 43 cut in substantially a semicircular cross-section from substantially the center portion in the longitudinal direction toward the rear end surface in the insertion direction. The cable 32 to be connected to the AC/DC converter 35 is extended from an end surface 43a of the cut portion 43 on the front side in the insertion direction. When the DC adapter 3 is housed in the battery housing portion 20, the cable 32 is lead outside of the camera main body 11 through a lead-out hole 59 formed on the side surface of the camera main body 11. A first electrode terminal 44 to come into contact with a second electrode 52a formed in the battery housing portion 20 is formed, in a projecting manner, at the front end of the second cylindrical portion 38 in the insertion direction thereof. The first electrode terminal 44 is positive.

When the DC adapter 3 is housed in the battery housing portion 20, the guide projection 53 is engaged with the first groove portion 39 formed between the first and second cylindrical portion 37 and 38, thereby realizing smooth insertion and extraction operation. The second groove portion 40 has an electrode terminal 45 to contact a third electrode 62 formed in an engaging projection 54 of the battery housing portion 20. A second electrode terminal 45 is negative. In the DC adapter 3, an electrode terminal corresponding to a first electrode 51a formed in the first housing portion 51 of the battery housing portion 20 is not formed at the front end of the first cylindrical portion 37 in the insertion direction thereof; instead, the second electrode terminal 45 is formed in the second groove portion 40. As a result, the positive and negative terminals are placed far apart from each other, as compared to the electrode arrangement in the dry batteries, secondary batteries, or battery unit 2, preventing the danger of short-circuit and thereby ensuring safety of the digital still camera 1. Further, as described above, the third electrode 62 is formed in the battery housing portion 20 at the position corresponding to the second electrode terminal 45. Thus, when electrical continuity between the second electrode 52a and third electrode 62 in the battery housing portion 20 is established, the digital still camera 1 side can determine that a dedicated DC adapter 3 conforming to the digital still camera 1 is being used. Therefore, it is possible to allow the digital still camera 1 to execute a particular operation that is available only when the dedicated DC adapter 3 is being used.

The height of the second electrode terminal 45 is less than those of the first and second cylindrical portions 37 and 38. That is, the second electrode terminal 45 does not exceed the outer circumferences of the first and second cylindrical portions 37 and 38 on the side that the second groove portion 40 faces. Therefore, it is possible to prevent the second electrode terminal 45 of the DC adapter 3 from damaging the components and the like in the battery housing portion 20, as well as prevent the danger of the damage of the electrode terminal 45, short-circuit, and the like.

A third groove portion 46 is formed continuously from the first groove portion 39 on the rear end surface of the DC adapter 3 in the insertion direction thereof. When the DC adapter 3 is housed in the battery housing portion 20 and the battery cover 15 is closed, the supporting projection 28 formed on the battery cover 15 is engaged with the third groove portion 46.

When the DC adapter 3 having the above configuration is inserted into the battery housing portion 20, the second negative electrode terminal 45 formed in the second groove portion 40 contacts the third electrode 62 formed in the engaging projection 54 before the first electrode terminal 44 formed at the front end of the second cylindrical portion 38 in the insertion direction thereof contacts the second electrode 52a formed on the battery housing portion 20 side. Thus, the negative terminal contacts the corresponding electrode before the positive terminal does, so that a stable power supply can be ensured.

Figure 13:
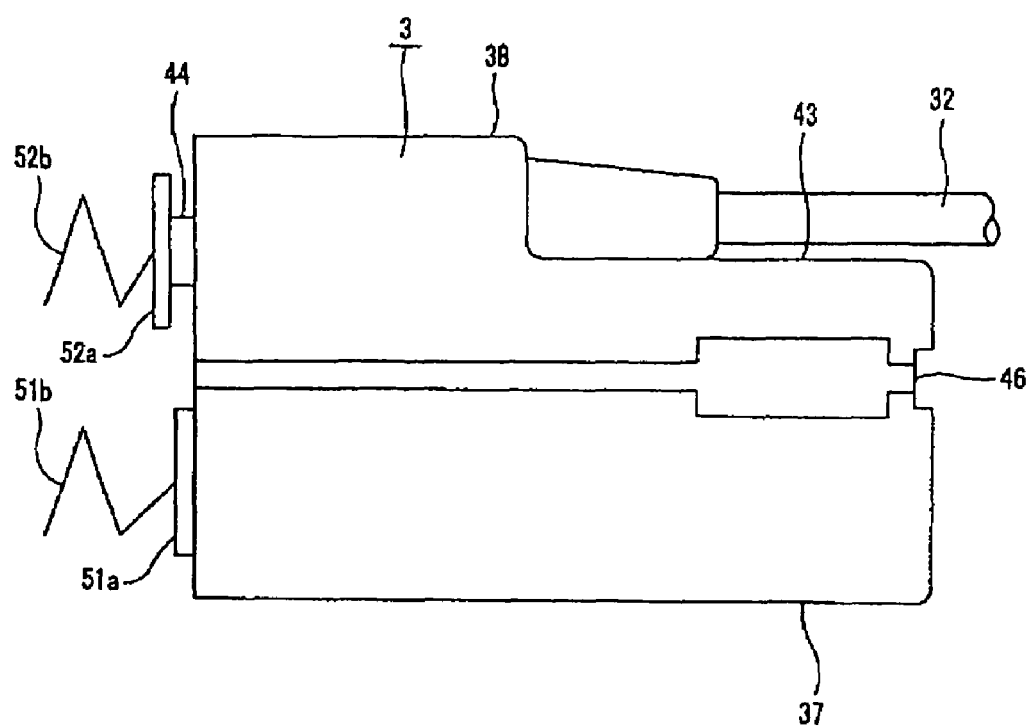
FIG. 13 is a plan view showing the DC adapter.

Further, in the DC adapter 3, the front end surface of the first cylindrical portion 37 in the insertion direction thereof is flattened and the longitudinal length of the first cylindrical portion 37 is smaller than that of the second cylindrical portion 38 having the projecting first electrode terminal 44 on the front end surface in the insertion section thereof, battery unit 2, dry battery 4, or secondary battery 5. This configuration reduces the load to the first cylindrical portion 37, the load being applied by a support spring 51b formed on the first electrode 51a of the battery housing portion 20 as shown in FIG. 13, Accordingly, the spring pressure needed when the battery cover 15 is closed against the housing of the DC adapter 3 is reduced, allowing closing operation of the battery cover 15 to be easily performed to increase operational feeling.

A description will next be given of the battery housing portion 20 in which the primary battery, secondary battery, abovementioned battery unit 2, or DC adapter 3 which supplies the camera main body 11 with a drive power is housed. The battery housing portion 20 is, as shown in FIG. 6, formed on the bottom portion of the camera main body 11 and includes first and second housing portions 51 and 52 into which various power sources are inserted and which face outward. The battery housing portion 20 is closed by the battery cover 15 (not shown in FIG. 6). The first and second housing portions 51 and 52 are formed in a hollow cylinder having a size suitable for housing, for example, size AA dry battery, respectively and arranged in the direction perpendicular to the longitudinal direction. The battery housing portion 20 further includes the guide projection 53 and the engaging projection 54 which are integrally formed with the first and second housing portions 51 and 52 at the upper and lower portions between the first and second housing portions 51 and 52 and are extended in the longitudinal direction thereof The guide projection 53 has a shape corresponding to the shape of the primary or secondary batteries whose cylindrical bodies are arranged in the direction perpendicular to the longitudinal direction or the shapes of the concave portion 2b formed between the cylindrical bodies of the battery unit 2 or first groove portion 39 formed between the cylindrical bodies of DC adapter 3 and thereby guides the insertion/extraction of the various power sources. The engaging projection 54 includes a lever switch (to be described later) and the third electrode 62.

Figure 14:
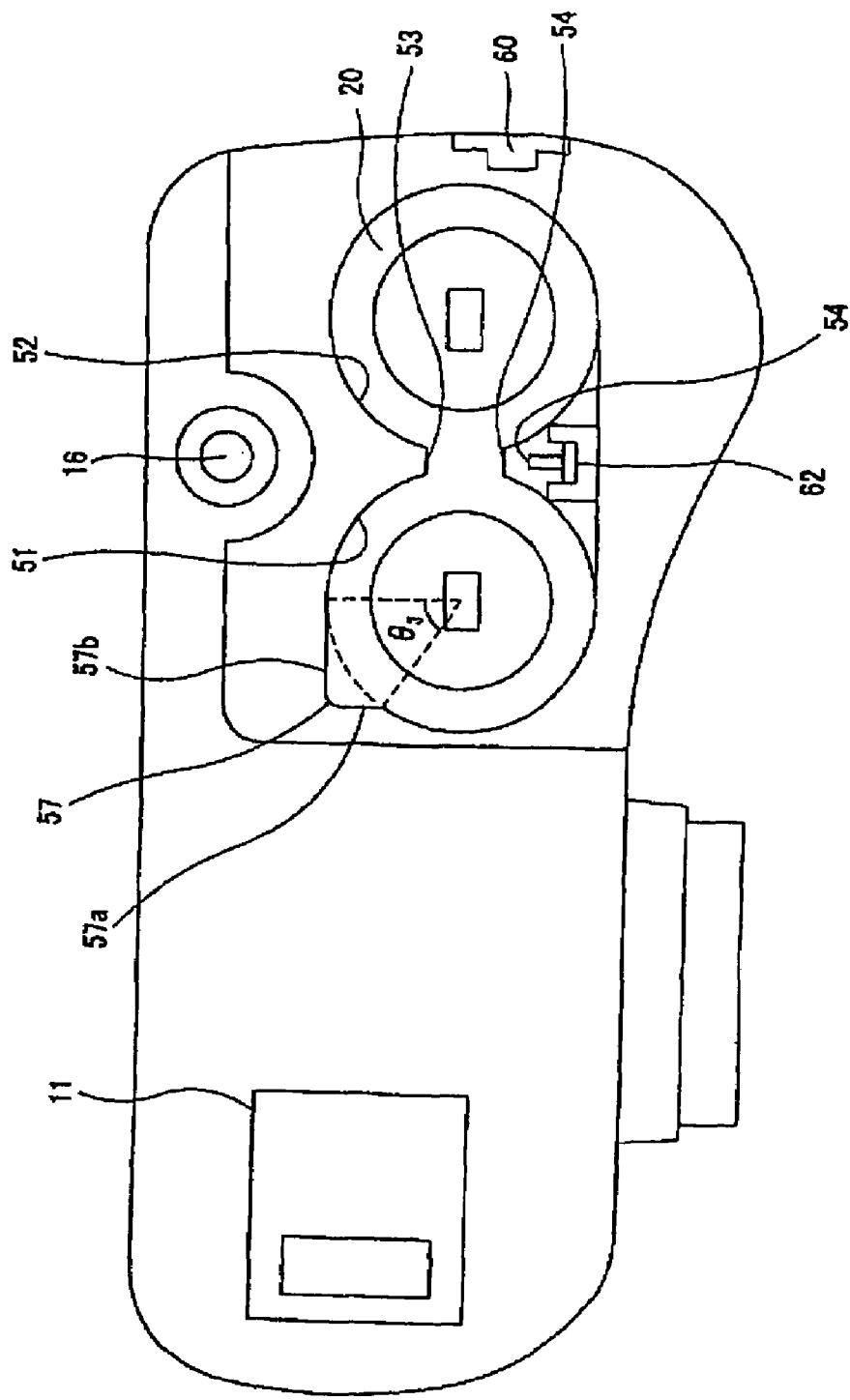
FIG. 14 is a front view showing the battery housing portion.

As shown in FIG. 14, the first housing portion 51 has, at a part of the inner circumference thereof, the insertion guide portion 57 for guiding the insertion of the DC adapter and preventing the wrong insertion. The insertion guide portion 57 is formed by cutting, in a rectangular shape, a part of the inner circumferential wall of the first housing portion 51. The insertion guide portion 57 includes adjacent first and second guide sides 57a and 57b between which the vertex of the insertion guide portion 57 is located. The first and second guide sides 57a and 57b constituting the insertion guide portion 57, which extend from the inner circumferential wall of the first housing portion 51, cross each other at right angles. The center angle θ3 of the circular arc obtained by connecting the proximal ends of the first and second guide sides 57a and 57b on the inner circumferential wall of the first housing portion 51 is less than 90°. That is, the first guide side 57a extends in a slightly inclined manner to the outside of the first housing portion 51 with respect to the tangential direction at the proximal end on the inner circumferential wall of the first housing portion 51; on the other hand, the second guide side 57b extends in the tangential direction at the proximal end on the inner circumferential wall of the first housing portion 51. As a result, the first and second guide sides 57a and 57b cross each other at right angles. Assuming that the proximal ends of the first and second guide sides 57a and 57b on the inner circumferential wall of the first housing portion 51 are connected to each other to form a circular arc, the center angle θ3 of the circular arc is less than 90°. Accordingly, the cut angle of the one corner at which the insertion guide portion 57 is formed is less than 90°. Thus, as shown in FIG. 9, when the size AA dry battery or secondary battery is inserted into the battery housing portion 20, the inner circumferential wall can also support a part of the side wall of the above battery on the insertion guide portion 57 side, thereby preventing the above battery from rattling within a battery housing portion 20 in the cutting direction.

Incidentally, in the insertion guide portion 57, the intersecting point between the first and second guide sides 57a and 57b is chamfered in a circular arc. Therefore, if the insertion limiting portion 41 formed in the DC adapter 3 is pressed against the insertion guide portion 57 at the time when the adapter 3 is inserted into the battery housing portion 20, they do not interfere with each other. As a result, it is possible to smoothly slide the adapter 3 as well as prevent dust and the like due to the slide from being generated.

The second housing portion 52 is formed into a hollow cylinder. The contact portion 58 is formed at the portion where a part of the inner circumferential wall of the second housing portion 52 is cut. When the DC adapter 3 is inserted into the battery housing portion 20 with reversed polarity, the insertion limiting portion 41 of the DC adapter 3 comes into contact with the contact portion 58 to prevent the insertion of the DC adapter 3. The lead-out hole 59 for leading the cord extended from the DC adapter 3 to the outside of the camera main body 11 is formed in the vicinity of the contact portion 58. The lead-out hole 59 is closed by a flexible closure piece 60. The closure piece 60 has one end fixed to the camera main body 11. When the DC adapter 3 is inserted into the battery housing portion 20, the closure piece 60 is rotated in the direction of the arrow A in FIG. 6 to open the lead-out hole 59. In this state, the cable 32 extended from the DC adapter 3 is lead outside of the camera main body 11 through the lead-out hole 59.

The first housing portion 51 has the first electrode 51a on the bottom portion thereof and the second housing portion 52 has the second electrode 52a on the bottom portion thereof. When the battery unit 2, dry battery 4, or secondary battery 5 is housed in the first and second housing portions 51 and 52, support springs 51b and 52b formed on the first and second electrodes 51a and 52a support the electrode terminals formed on the insertion side end surfaces of the various power sources.

As described above, the longitudinal length of the first cylindrical portion 37 of the DC adapter 3 is smaller than that of the second cylindrical portion 38, battery unit 2, dry battery 4, or secondary battery 5. This configuration reduces, as shown in FIG. 13, the load to the first cylindrical portion 37, the load being applied by the support spring 51b formed on the first electrode 51a. Accordingly, the spring pressure needed when the battery cover 15 is closed against the housing of the DC adapter 3 is reduced, allowing closing operation of the battery cover 15 to be easily performed to increase operational feeling.

The guide projection 53 for guiding the insertion/extraction of the various power sources is formed between the first and second housing portions 51 and 52. The guide projection 53 is formed by extending the adjacent inner circumferential walls of the first and second housing portions 51 and 52 and is projected toward the inner surface side of the battery housing portion 20. The guide projection 53 serves to guide the insertion/extraction of the various power sources such as an dry battery or secondary battery as well as serves as a partition wall which separates the inserted dry batteries or secondary batteries from each other. When the battery unit 2 is housed in the battery housing portion 20, the guide projection 53 is engaged with the concave portion 2b of the battery unit 2 to guide the insertion/extraction of the battery unit 2. When the DC adapter 3 is housed in the battery housing portion 20, the guide projection 53 is engaged with the first groove portion 39 of the DC adapter 3 to guide the insertion/extraction of the DC adapter 3.

When the battery unit 2 is inserted into the battery housing portion 20 with reverse polarity and the concave portion 2a is engaged with the guide projection 53, the engaging portion 25 formed on the concave portion 2a comes into contact with the guide projection 53 to limit the insertion into the battery housing portion 20, preventing the wrong insertion.

The engaging projection 54 including the lever switch 61 and third electrode 62 is formed at the position that faces the guide projection 53. Like the guide projection 53, the engaging projection 54 is formed by extending the adjacent inner circumferential walls of the first and second housing portions 51 and 52 and is projected toward the inner surface side of the battery housing portion 20. The engaging projection 54 includes, at the portions on the opening end side of the first and second housing portions 51 and 52, the lever switch 61 and third electrode 62. The lever switch 61 comes into contact with the engaging portion 25 of the battery unit 2 to determine the type of the inserted battery unit 2 based on the shape of the identification portion 26 formed on the end surface of the engaging portion 25. The third electrode 62 contacts the second electrode terminal 45 of the DC adapter 3.

Figure 15A:
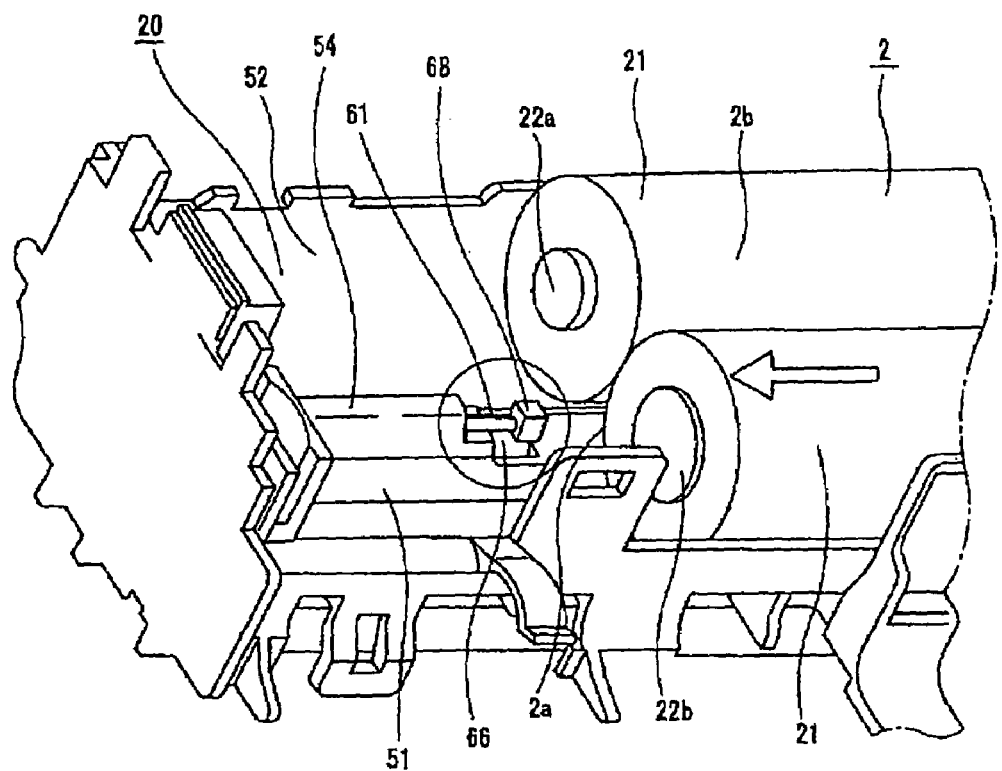
FIG. 15A is a perspective view showing the interior of the battery housing portion.
Figure 15B:
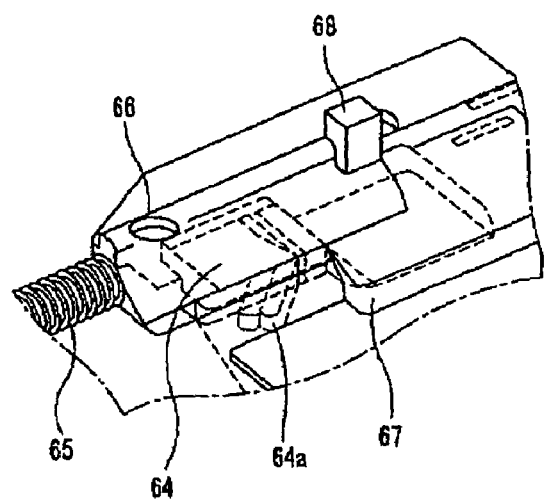
FIG. 15B is a partial enlarged perspective view.

The engaging projection 54 is formed into a hollow shape and has an opened end surface on the opening side of the battery housing portion 20. As shown in FIG. 15A and FIG. 15B, the engaging projection 54 includes the lever switch 61 as well as a detection switch 64 to be pressed by the lever switch 61, and a biasing member 65 which biases the lever switch 61 to the opening end side.

The lever switch 61 includes: an insertion portion 66 to be inserted into the engaging projection 54 and slid in the housing direction of the battery unit 2; an operation portion 67 which is formed integrally with the insertion portion 66 and presses the detection switch 64 in accordance with the slide amount of the insertion portion 66; and a press portion 68 which is projected from one end of the insertion portion 66 and pressed by the engaging portion 25 of the battery unit 2. The press portion 68 on the insertion portion 66 is projected from a one end portion 66a on the opening end side of the engaging projection 54 toward the battery housing portion 20 to face the moving area of the engaging portion 25 of the battery unit 2. Therefore, when the battery unit 2 is housed in the battery housing portion 20, the press portion 68 is pressed by the engaging portion 25, allowing the lever switch 61 to be slidably moved to the depth of the engaging projection 54. One end portion on the opposite side to the other end portion at which the press portion 68 is formed is biased by the biasing member 65 provided in the engaging projection 54, so that the insertion portion 66 is biased to the opening side of the battery housing portion 20 all the time. The operation portion 67, which is formed integrally with the insertion portion 66, is moved in accordance with the slide amount of the insertion portion 66. The operation portion 67 presses the detection switch 64 provided on the moving area to operate the detection switch 64.

The detection switch 64 includes a detection lever 64a which determines the type of the battery unit 2 based on the rotation amount, as shown in FIG. 15B. The detection lever 64a is so provided as to face the movement area of the operation portion 67 of the lever switch 61.

When the battery unit 2 is not housed in the battery housing portion 20, the insertion portion 66 of the lever switch 61 is biased by the biasing member 65 and positioned on the opening end side of the engaging projection 54. At this time, the operation portion 67 formed integrally with the insertion portion 66 does not contact the detection lever 64a of the detection switch 64.

When the battery unit 2 is housed in the battery housing portion 20, the press portion 68 of the lever switch 61 is pressed by the identification portion 26 formed on the front end surface 25a of the engaging portion 25 to allow the insertion portion 66 to be slid to the depth of the engaging projection 54. The slide amount at this time of the lever switch 61 differs depending on the shape of the identification portion 26. That is, when the identification portion 26 has a projected shape, the insertion portion 66 is slid to the depth of the engaging projection 54; when the identification portion 26 has a flat shape, the insertion portion 66 is slid by a smaller amount than in the case of the projected shape; and when the identification portion 26 has a concave shape, the insertion portion 66 is slid by a smaller amount than in the case of the flat shape. That is, the slide amount of the operation portion 67 differs depending on the slide amount of the insertion portion 66, so that the rotation amount of the detection lever 64a of the detection switch 64 pressed by the operation portion 67 differs. As described above, the identification section 26 is formed into, for example, a projected, flat, or concave shape depending on the charge-discharge characteristics such as service capacity, charging voltage, or charging current of the battery unit 2. Therefore, the rotation amount of the detection lever 64a differs depending on the shape of the identification portion 26, so that it is possible to determine the type of the inserted battery unit 2 by detecting the rotation amount and thereby to perform an optimal operation such as charging in accordance with the type of the battery unit 2.

When the battery unit 2 is removed from the battery housing portion 20, the insertion portion 66 of the lever switch 61 that has been pressed by the engaging portion 25 is slid to the opening end side of the engaging projection 54 by the biasing member 65. Accordingly, the operation portion 67 is slid to the opening end side of the battery housing portion 20 together with the insertion section 66, releasing the pressure against the detection switch 64.

The third electrode 62 which contacts the second electrode terminal 45 formed in the DC adapter 3 is formed in front of the lever switch 61. The third electrode 62 is formed between the first and second housing portions 51 and 52 of the battery housing portion 20 to face the moving area of the second electrode terminal 45 formed on the second groove portion 40 in the DC adapter 3. When the DC adapter 3 is inserted into the battery housing portion 20, the third electrode 62 contacts the second electrode terminal 45 before the first electrode terminal 44 formed in the second cylindrical portion 38 of the DC adapter 3 contacts the second electrode 52a formed in the second housing portion 52. The second electrode terminal 45 is negative, which means that, in the DC adapter 3, the contact of the negative electrode precedes that of the positive electrode. Therefore, an electrical power is stably supplied by the DC adapter 3.

When electrical continuity between the second electrode 52a formed in the second housing portion 52 and third electrode 62 is established, the digital still camera 1 side can determine that a dedicated DC adapter 3 conforming to the digital still camera 1 is being used. Therefore, it is possible to allow the digital still camera 1 to execute a particular operation that is available only when the dedicated DC adapter 3 is being used.

When the above digital still camera 1 is placed on a camera stand (not shown) connected to a home alternating current power source in a state where the battery unit 2 is housed in the battery housing portion 20, the alternating current power source is converted into a direct current power source and the battery unit 2 is charged. Further, it is possible to charge the battery unit 2 or secondary battery 5 by attaching it to a charger 70 to be described below.

Figure 16:
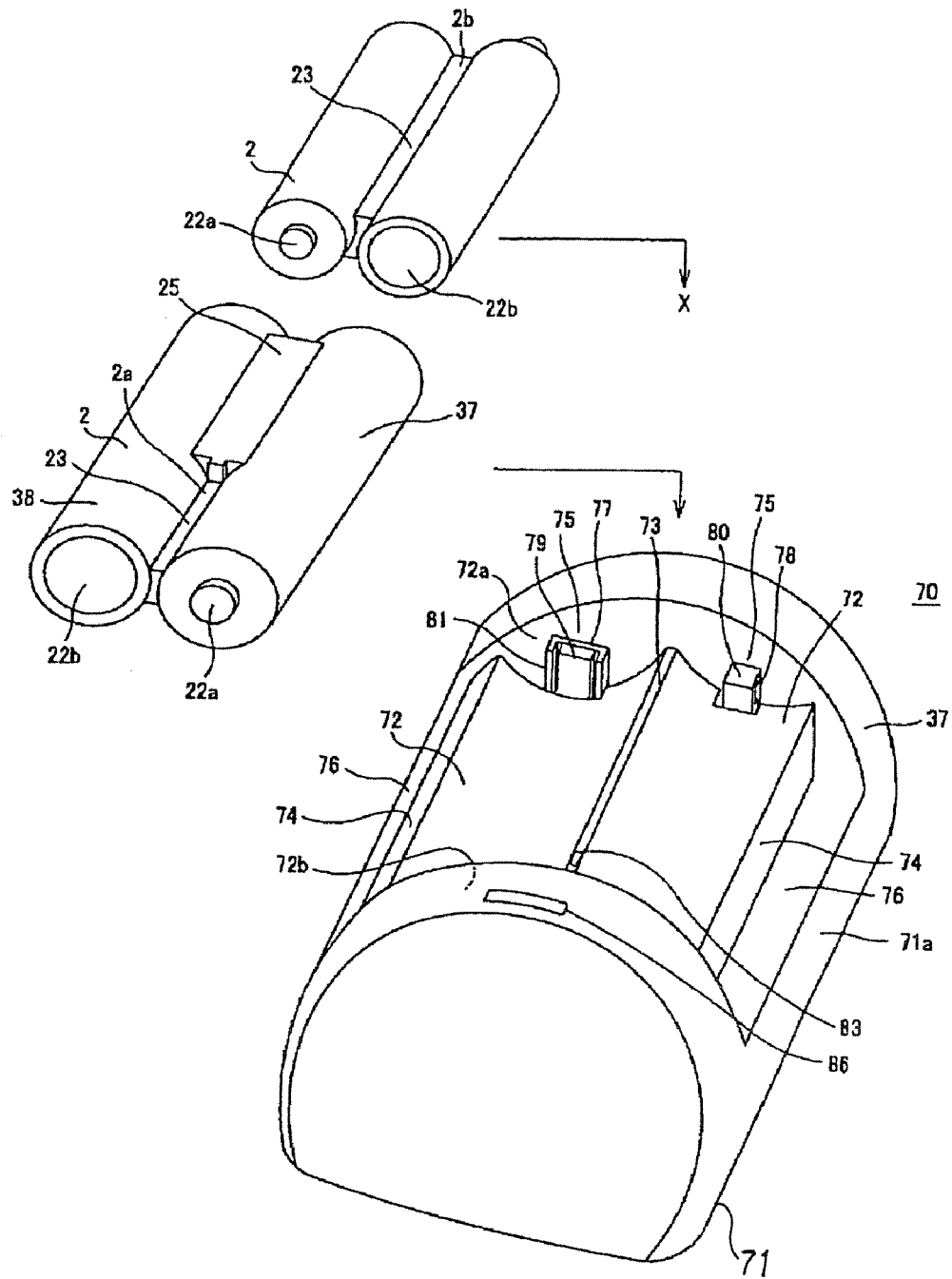
FIG. 16 is a perspective view showing a battery charger.

The charger 70 can charge the battery unit 2 and a simple secondary battery 5. As shown in FIG. 16, the charger 70 includes: a main body 71 in the form of a half circle in its cross section; two battery housing portions 72 and 72 each of which has end surfaces 72a and 72b at either end formed on the upper surface of the main body 71; a partition wall 73 which partitions the battery housing portions 72 and 72 from each other; side walls 74 and 74 formed on the outside sides of the respective battery housing portions 72 and 72 in the longitudinal direction of the main body 71; and electrode support portions 75 which support respective electrode terminals provided in the battery unit 2 or secondary battery 5.

Figure 17:
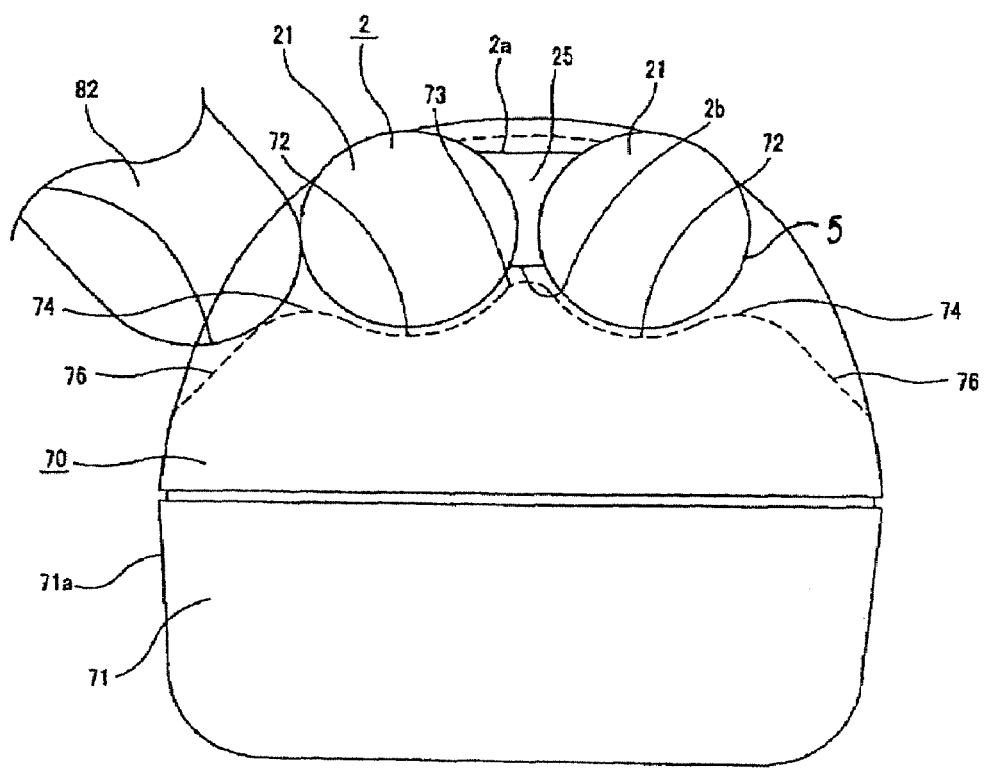
FIG. 17 is a cross-sectional view showing the battery charger in a state where the battery unit is attached thereto.

The battery housing portion 72 has a size suitable for housing the nickel-hydrogen secondary battery 21 of the battery unit 2 having the same size as that of the size AA dry battery, or a simple secondary battery 5 and has a cross-section having substantially a circular arc. The two battery housing portions 72 and 72 are adjacently arranged in the direction perpendicular to the longitudinal direction of the charger 70 and are partitioned from each other by the partition wall 73. The side wall 74 is formed on the outside side of each of the battery housing portions 72. As shown in FIG. 17, the partition wall 73 and side wall 74 are formed integrally with the battery housing portion 72 and have circular arc shapes. The heights of the partition wall 73 and the side wall 74 are less than the height of the center axis of the nickel-hydrogen secondary battery 21 of the battery unit 2 or secondary battery 5 that is housed in the battery housing portions 72. The height of the side wall 74 is less than that of the partition wall 73. A slope portion 76 which declines to a side surface 71a of the main body 71 is formed continuously from the side wall 74. With the above configuration, a user can easily place his or her finger 82 on the lower side surface of the battery unit 2 or secondary battery 5 that has been housed in the battery housing portions 72 through the side walls 74 and thereby the battery can be removed smoothly.

Further, as described above, the battery housing portion 72 includes the electrode support portions 75 formed on both end surfaces 72a and 72b in the longitudinal direction of the charger 70. In the electrode support portions 75, first and second conductive plates 79 and 80 made of flexible metal plates are exposed from first and second cut portions 77 and 78 obtained by cutting the both edge surfaces 72a and 72b of the battery housing portion 72 in a rectangular shape. The first conductive plate 79 supports the positive terminal of the battery unit 2 or secondary battery 5. A support wall 81 which supports the projected positive terminal is raised around the first cut portion 77 from which the first conductive plate 79 is exposed to the outside. The second conductive plate 80 supports the negative terminal of the battery unit 2 or secondary battery 5. The second conductive plate 80 is sloped from the upper end portion of the second cut portion 78 to the lower side and is bent downward in the intermediate portion of the plate. That is, the second conductive plate 80 is so formed as to be projected to the battery housing portion 72 side. As described above, in the battery unit 2, the two nickel-hydrogen secondary batteries 21 are arranged with the positive terminal 22a and negative terminals 22b reversed between the two. Correspondingly, the first cut portion 77 and first conductive plate 79 and the second cut portion 78 and second conductive plate 80 are reversed respectively between adjacently arranged two battery housing portions 72. When the battery unit 2 or secondary battery 5 is housed in the battery housing portions 72, the projected positive terminal is supported by the support wall 81 formed in the first cut portion 77 and the flat negative terminal is supported by the second conductive plate 80 projected toward the battery housing portion 72 side. As a result, the battery unit 2 or secondary battery 5 can be retained in the battery housing portions 72.

The insertion of the battery unit 2 or secondary battery 5 into the battery housing portions 72 is guided by the circular arc-shaped partition wall 73 and side walls 74. Further, the partition wall 73 formed between the adjacent battery housing portions 72 prevents the battery unit 2 or secondary battery 5 from slanting at the time when being housed.

As shown in FIGS. 16 and 17, when the positive terminal 22a of the battery unit 2 is allowed to face the first cut portion 77 and the first conductive plate 79, and the negative terminal 22b is allowed to face the second cut portion 78 and the second conductive plate 80, the concave portion 2b on which the engaging portion 25 is not formed faces the partition wall 73. That is, when the battery unit 2 is housed in the battery housing portion 72 with the proper polarity as described above, the concave portion 2b is engaged with the partition wall 73 of the charger 70. On the other hand, when the battery unit 2 is housed in the battery housing portion 72 with the reversed polarity, the concave portion 2a and partition wall 73 face each other, so that the engaging portion 25 of the concave portion 2a comes into contact with the partition wall 73 to limit the housing of the battery unit 2. Thus, in this manner, the wrong insertion of the battery unit 2 can be prevented.

When the secondary battery 5 is housed in the battery housing portion 72 with the proper polarity, the periphery of the projected positive terminal of the second battery 5 is supported by the support wall 81 formed in the first cut portion 77 of the charger 70, as described above. On the other hand, when the secondary battery 5 is housed in the battery housing portion 72 with the reversed polarity, the projected positive terminal of the second battery 5 is biased to the upper surface side by the sloped surface of the second conductive plate 80 formed in the battery housing portion 72 in a projected manner, to thereby limit the housing of the second battery 5. Thus, in this manner, the wrong insertion of the secondary battery 5 can be prevented.

The charger 70 includes a detection means 83 for detecting whether both of the two nickel-hydrogen secondary batteries 21 have been attached to the battery housing portions 72. When the battery unit 2 has been attached to the battery housing portions 72, the charger 70 performs a charging operation suitable for the battery unit 2. That is, the charger 70 is configured to be able to perform a charging operation for the simple secondary battery 5 and the battery unit 2 constituted by combining the secondary batteries. The secondary battery 5 differs in its charging characteristics such as charging voltage or charging capacity, or quality depending on the manufacturer of the battery; whereas the charging characteristics of many battery units 2 are previously defined and therefore the qualities thereof are stable. When the battery unit 2 is attached to the charger 70, therefore, the charger 70 selects an optimal charging mode from the known charging characteristics to perform, for example, a quick charging. This provides more convenience to the users. For the above reason, the charger 70 which charges the battery unit 2 includes the detection means 83 which determines whether the battery unit 2 or simple secondary battery 5 has been attached thereto and detects whether both of the two nickel-hydrogen secondary batteries 21 of the battery unit 2 have been attached to the battery housing portions 72. With the above configuration, when both of the two nickel-hydrogen secondary batteries 21 of the battery unit 2 have been attached to the battery housing portions 72, the charger 70 performs an optimal charging operation, such as a quick charging, for the battery unit 2.

The detection means 83 determines whether the simple secondary battery 5 or the battery unit 2 has been attached to the battery housing portions 72 as well as detects, in the case where the battery unit 2 has been attached, whether both of the two nickel-hydrogen secondary batteries 21 of the battery unit 2 have been attached to the battery housing portions 72. The charger 70 starts performing a charging operation when detecting one secondary battery 5 attached to one of the battery housing portions 72 in the case where the simple secondary battery has been attached or when detecting two nickel-hydrogen secondary batteries 21 of the battery unit 2 attached to all the battery housing portions 72.

The above detection means 83 is constituted as follows: for example, a projection which is projected to the concave portion 2b side is formed on the separator 23 of the battery unit 2, an insertion hole into which the projection is inserted is formed in the partition wall 73 of the charger 70, and a detection switch is provided in the insertion hole. According to the detection means 83, when both of the two nickel-hydrogen secondary batteries 21 of the battery unit 2 are housed in the battery housing portions 72 with the proper polarity, the concave portion 2b and the partition wall 73 are engaged with each other and, at the same time, the projection formed on the separator 23 is inserted into the insertion hole on the partition wall 73 to depress the detection switch. By this, it is possible to detect that the battery unit 2 dedicated for the digital still camera 1 has been attached to the charger 70 as well as that both of the two nickel-hydrogen secondary batteries 21 have been attached to the charger 70. On the other hand, when the one or two simple secondary batteries 5 have been attached to the charger 70, the detection switch is not depressed since there is no projection to be inserted into the insertion hole on the partition wall 73. Accordingly, the charger 70 can determine that the simple secondary battery 5 has been attached thereto.

A configuration in which an IC tag is provided in the battery unit 2 and a reading system for the IC tag is provided in the charger 70 side can be adapted as the detection means 83. The IC tag is provided for each of the two nickel-hydrogen secondary batteries 21 and the reading system for the IC tag is provided in each of the battery housing portions 72. The detection means 83 having the above configuration also can detect that the battery unit 2 dedicated for the digital still camera 1 has been attached to the charger 70 as well as that both of the two nickel-hydrogen secondary batteries 21 have been attached to the charger 70 by reading out the IC tags.

Further, when charge-discharge characteristics information of the battery unit 2, including charging voltage, charging capacity and the like is attached to the IC tag and the charger 70 reads out the charge-discharge characteristics information, the charger 70 can determine whether a quick charging operation is possible or not, and can thereby select an optimal charging mode for the inserted battery unit 2.

As described above, when the dedicated battery unit 2 is attached, the charger 70 performs a quick charging operation or the like in accordance to the charge-discharge characteristics of the battery unit 2; whereas when determining that the simple secondary battery 5 has been attached, the charger 70 assumes that various types of the second batteries whose rated voltage, rated capacity or quality are different between them are attached thereto, and performs a charging operation with a charging voltage or charging capacity that does not bring about an accident irrespective of the quality of the secondary battery.

Figure 18:
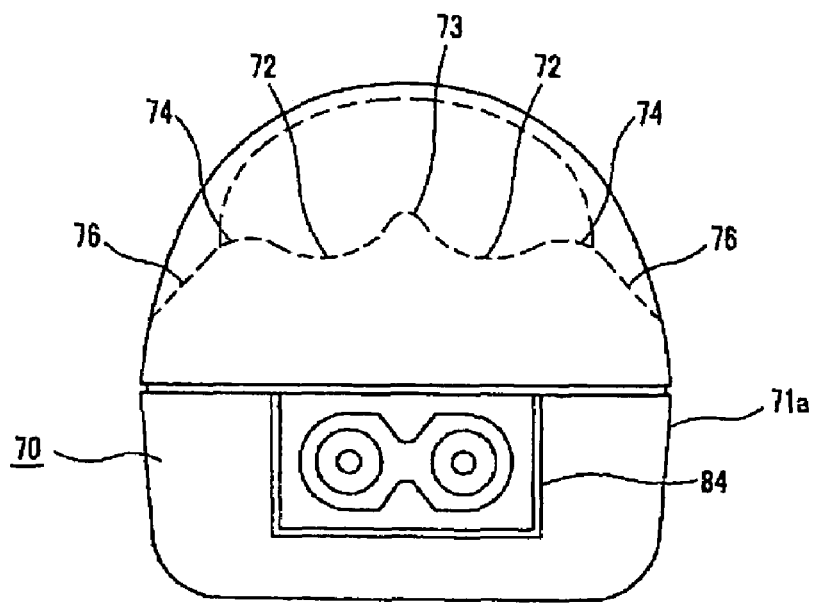
FIG. 18 is a side view showing the battery charger.
Figure 19:
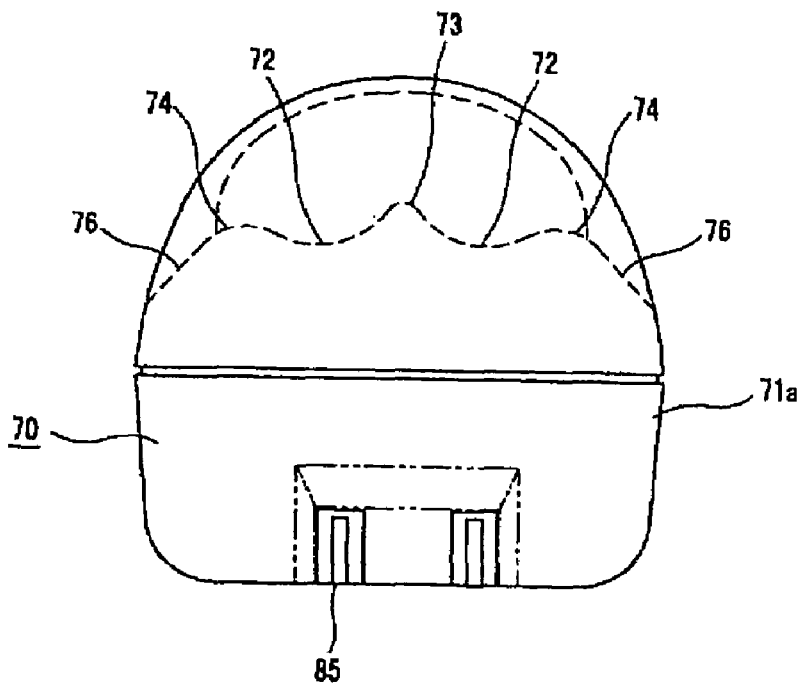
FIG. 19 is a side view showing another example of the battery charger.

An inlet 84 is formed in one end surface of the main body 71 of the charger 70 in the longitudinal direction thereof, as shown in FIG. 18. Connected to the inlet 84 is one end of a power cable with an AC/DC converter, the other end of which is connected to a home alternating current power source. Instead of the above inlet 84, the charger 70 may incorporate the AC/DC converter and include a plug 85 to be connected to a home alternating current power source as shown in FIG. 19. On the upper surface of the charger 70, a display portion 86 is formed outside the area in which the battery housing portions 72 are formed. The display portion 86 indicates the start or end of a charging operation with lighting and extinction of a light.

While the charger 70 of the above embodiment includes two battery housing portions 72, it may include three or more battery housing portions 72. In this case, the charger 70 can be used for the battery unit in which three or more secondary batteries are arranged.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention.

The invention claimed is:
1. A DC adapter which, in use, is connected to an AC/DC converter and is inserted into a battery housing portion of an electronic apparatus so as to supply the electronic apparatus with DC power, said DC adapter comprising:
(a) a substantially cylindrical adapter main body which has an insertion limiting portion which is sized, shaped, and positioned
(i) to be guided by an insertion guide portion of the battery housing portion when the DC adapter is inserted into the battery housing portion with the proper polarity and
(ii) to come into contact with the insertion end side wall of the battery housing portion when the DC adapter is inserted into the battery housing portion with the reversed polarity so as to limit the insertion of the DC adapter;
wherein
(b) the insertion limiting portion
(i) is formed by projecting a part of the outer circumference of the substantially cylindrical adapter main body in a rectangular manner along the longitudinal direction of the substantially cylindrical adapter main body and
(ii) has two sides each of which extends from a part of the outer circumference of the DC adapter;
(c) a center angle is obtained by connecting the proximal ends of the two sides on the outer circumference of the DC adapter;
(d) the center angle is less than 90°;
(e) the substantially cylindrical adapter main body is formed by arranging a plurality of cylindrical bodies in the direction perpendicular to the longitudinal direction; and
(f) an electrode terminal is formed at the concave portion between the cylindrical bodies.

2. The DC adapter according to claim 1, wherein the vertex of the insertion limiting portion is chamfered in a circular arc.

3. The DC adapter according to claim 1, wherein:
(a) the electrode terminal is a negative terminal and
(b) when the adapter main body is inserted into the battery housing portion, the electrode terminal comes into contact with a negative electrode formed in the battery housing portion before a positive terminal formed on the insertion side end surface of the cylindrical body comes into contact with a corresponding electrode.

4. The DC adapter according to claim 1, wherein the height of the electrode terminal does not exceed the line segment contacting the plurality of cylindrical bodies.

5. The DC adapter according to claim 1, wherein one of the adjacent projecting first and second surfaces constituting the insertion limiting portion extends in the tangential direction at the proximal end on the substantially cylindrical adapter main body.

6. An electronic apparatus comprising:
(a) a battery housing portion; and
(b) a DC adapter which is connected to a cylindrical primary battery, a cylindrical secondary battery, or an AC/DC converter to supply the electronic apparatus with DC power and is inserted in the battering housing,
wherein
(c) the battery housing portion
(i) has a circular inner circumference wall and
(ii) includes an insertion guide portion which is formed by cutting, in a rectangular shape, a part of the circular inner circumferential wall thereof to meet the shape of an insertion limiting portion formed by projecting a part of the outer circumference of the DC adapter and is engaged with the insertion limiting portion when the DC adapter is inserted with the proper polarity to guide the insertion of the DC adapter;
(d) the center angle of the circular arc obtained by connecting the proximal ends of two sides constituting the insertion guide portion on the inner circumference of the battery housing portion is less than 90°;
(e) when the DC adapter is inserted with the reversed polarity, the insertion limiting portion comes into contact with the insertion end side wall of the battery housing portion and the insertion of the DC adapter is limited; and
(f) the battery housing portion includes
(i) a plurality of housing portions which houses a plurality of primary batteries or secondary batteries, or an assembled battery obtained by arranging in an integrated manner the secondary batteries in the direction perpendicular to the longitudinal direction,
(ii) a first electrode formed on each of the housing portions, and
(iii) a second electrode which contacts a second electrode terminal formed on a concave portion of the DC adapter including, (A) a plurality of cylindrical portions arranged in the direction perpendicular to the longitudinal direction to meet the shape of the housing portions, (B) a first electrode terminal formed on one of the cylindrical portions, and (C) a concave portion formed between the cylindrical portions; and (g) the second electrode is formed between the housing portions to face the movement path of the electrode terminal.

7. The electronic apparatus according to claim 6, wherein:

(a) the first electrode is positive and second electrode is negative and (b) when the DC adapter is inserted into the battery housing portion, the second electrode comes into contact with the second electrode terminal before the first electrode comes into contact with the first electrode terminal formed on the cylindrical portion.

8. The electronic apparatus according to claim 6, wherein:

(a) the first electrode terminal is the projected positive terminal;

(b) the insertion end side surface of the cylindrical portion on which the first electrode terminal is not formed has a flat portion the height of which is less than the first electrode terminal; and (c) the housing portion supports the flat portion by means of an elastic member which supports the negative electrode of the primary or secondary battery.

9. The electronic apparatus according to claim 6, wherein one of the first and second surfaces which are obtained by cutting, in a rectangular shape, a part of the circular inner circumferential wall and constituting the insertion guide portion extends in the tangential direction at the proximal end on the inner circumference of the battery housing portion.

10. The electronic apparatus according to claim 6, wherein the vertex of the insertion guide portion is chamfered in a circular arc.

* * * * *